United States Patent
Elshafie et al.

(10) Patent No.: US 12,414,086 B2
(45) Date of Patent: Sep. 9, 2025

(54) PHYSICAL SIDELINK FEEDBACK CHANNEL RESOURCE SELECTION

(71) Applicant: QUALCOMM Incorporated, San Diego, CA (US)

(72) Inventors: Ahmed Elshafie, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 17/661,145

(22) Filed: Apr. 28, 2022

(65) Prior Publication Data
US 2023/0354272 A1    Nov. 2, 2023

(51) Int. Cl.
*H04W 72/04*    (2023.01)
*H04L 1/1812*    (2023.01)

(52) U.S. Cl.
CPC ........... *H04W 72/04* (2013.01); *H04L 1/1812* (2013.01)

(58) Field of Classification Search
CPC ..... H04W 72/04; H04W 72/02; H04W 72/23; H04W 72/53; H04W 76/11; H04W 92/18; H04W 76/14; H04L 1/1812; H04L 2001/0092; H04L 1/1854; H04L 5/0092
See application file for complete search history.

(56) References Cited

U.S. PATENT DOCUMENTS

| | | | |
|---|---|---|---|
| 2021/0014831 A1* | 1/2021 | Ryu | H04W 72/02 |
| 2021/0227506 A1* | 7/2021 | Zhang | H04W 72/0453 |
| 2022/0191836 A1* | 6/2022 | Liu | H04L 5/0053 |

\* cited by examiner

*Primary Examiner* — Dady Chery
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may select a resource pool, from a plurality of resource pools for physical sidelink feedback channel (PSFCH) communications, based at least in part on a first parameter of a set of parameters. The UE may select a resource block, from a plurality of resource blocks within the resource pool, based at least in part on a second parameter of the set of parameters. The UE may perform a PSFCH communication via the selected resource block. Numerous other aspects are described.

30 Claims, 14 Drawing Sheets

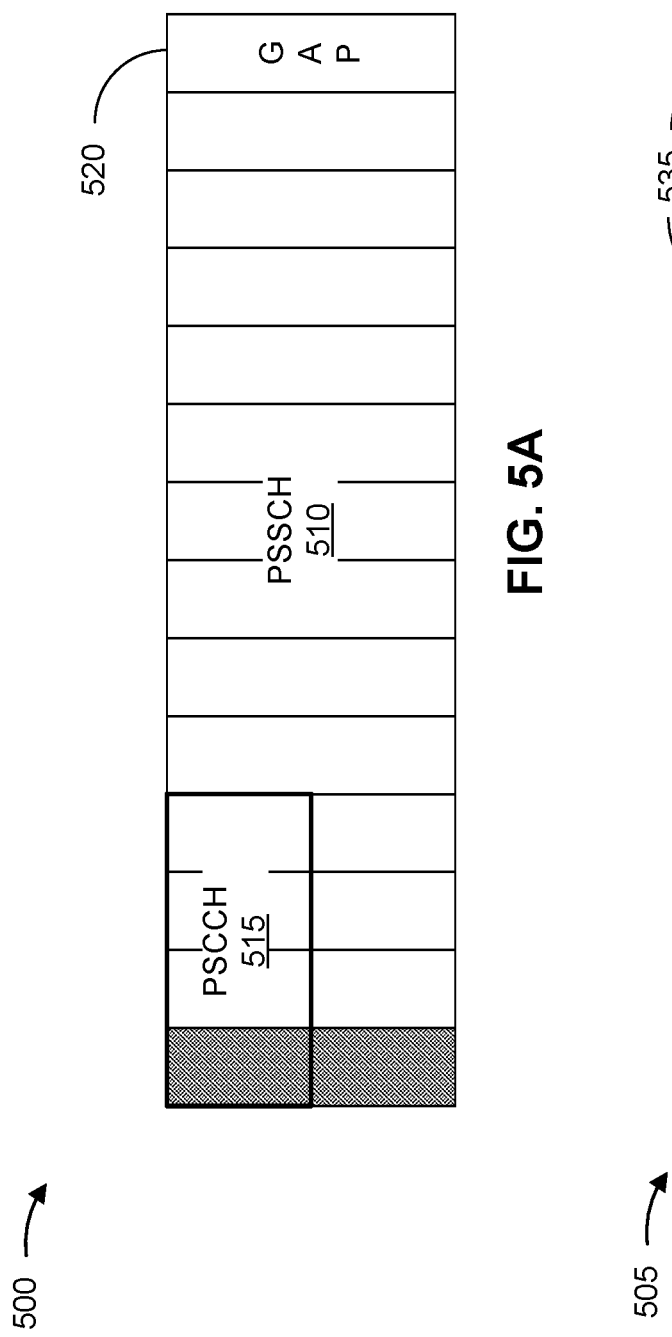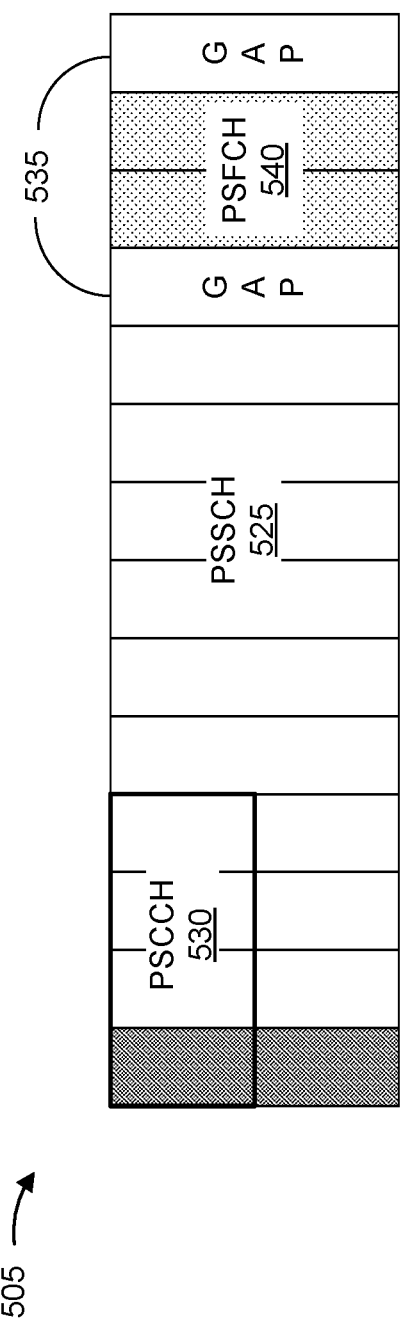

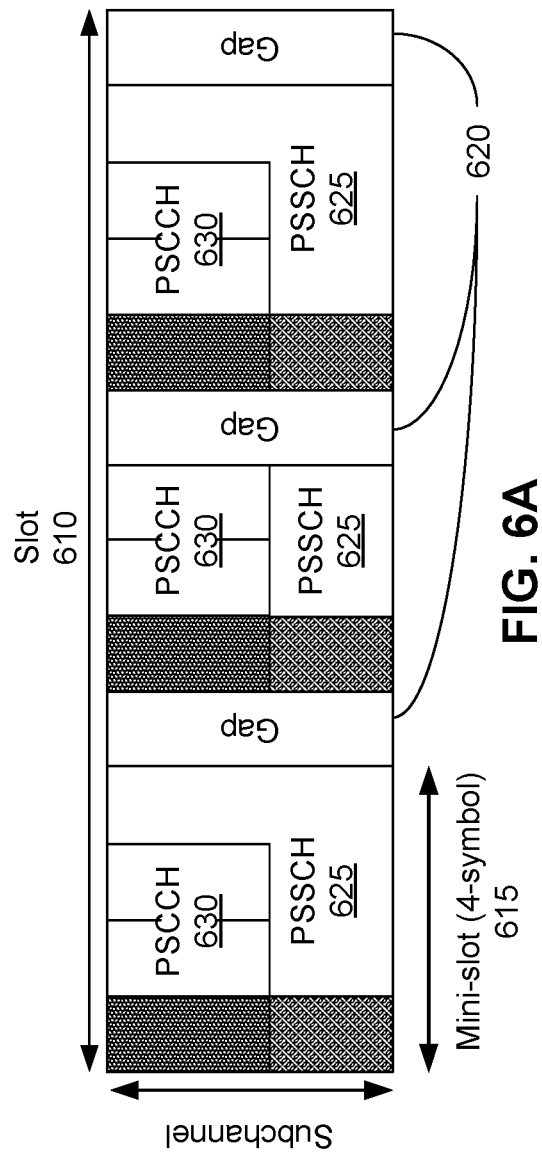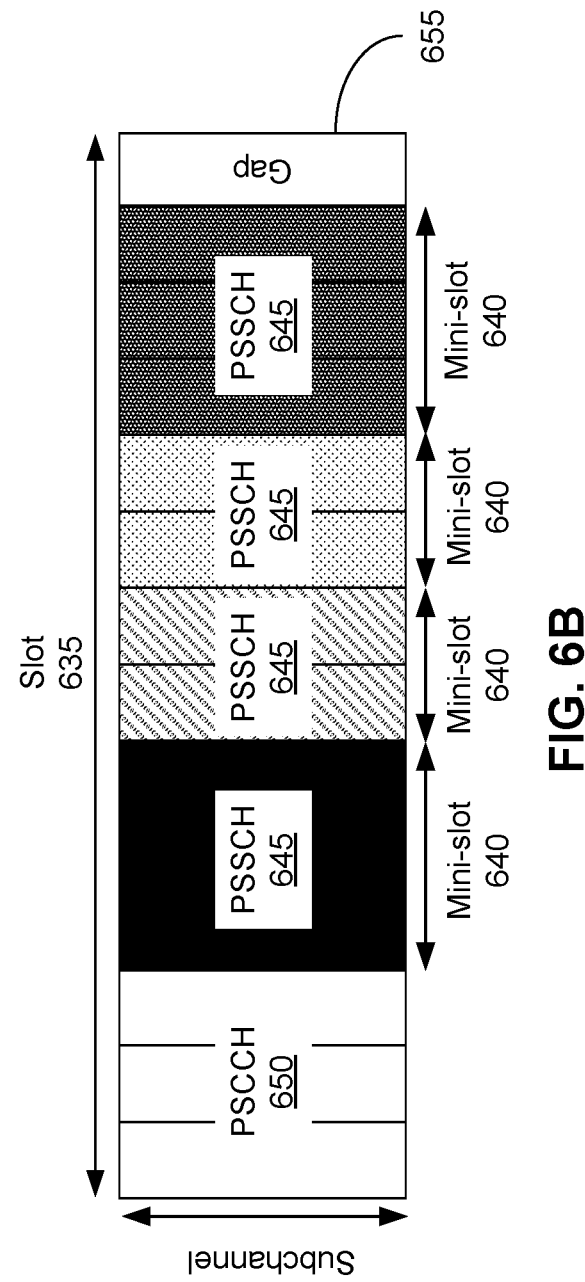

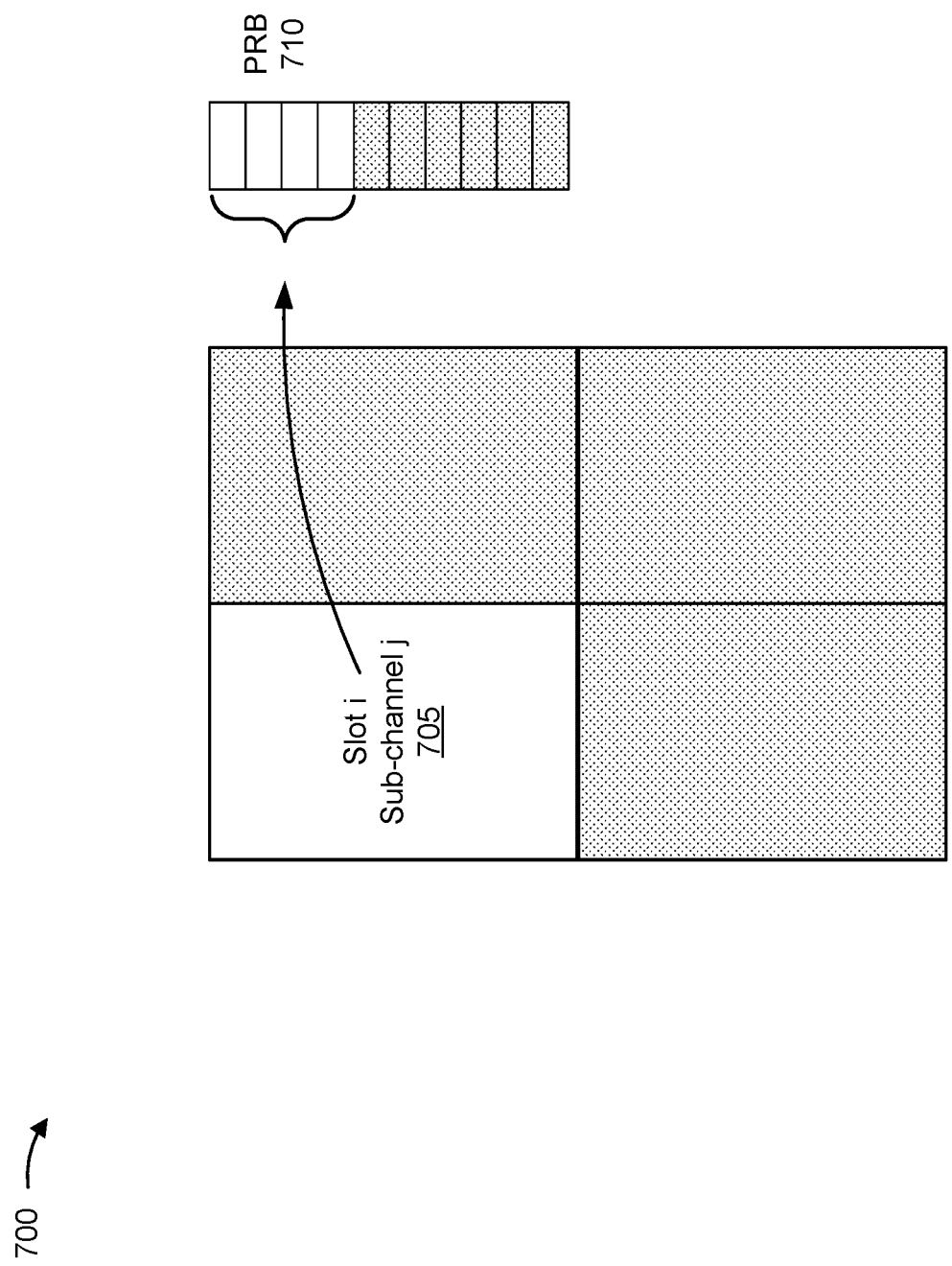

PHYSICAL SIDELINK FEEDBACK CHANNEL RESOURCE SELECTION

FIELD OF THE DISCLOSURE

Aspects of the present disclosure generally relate to wireless communication and to techniques and apparatuses for physical sidelink feedback channel resource selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include selecting a resource pool, from a plurality of resource pools for physical sidelink feedback channel (PSFCH) communications, based at least in part on a first parameter of a set of parameters. The method may include selecting a resource block, from a plurality of resource blocks within the resource pool, based at least in part on a second parameter of the set of parameters. The method may include performing a PSFCH communication via the resource block selected from the plurality of resource blocks within the resource pool.

Some aspects described herein relate to a method of wireless communication performed by a UE. The method may include obtaining an indication to transmit feedback via a first PSFCH resource. The method may include selecting, based at least in part on a time threshold, a second PSFCH resource for transmitting the feedback. The method may include transmitting the feedback via the second PSFCH resource.

Some aspects described herein relate to an apparatus for wireless communication performed by a UE. The apparatus may include a memory and one or more processors, coupled to the memory. The one or more processors may be configured to select a resource pool, from a plurality of resource pools for PSFCH communications, based at least in part on a first parameter of a set of parameters. The one or more processors may be configured to select a resource block, from a plurality of resource blocks within the resource pool, based at least in part on a second parameter of the set of parameters. The one or more processors may be configured to perform a PSFCH communication via the resource block selected from the plurality of resource blocks within the resource pool.

Some aspects described herein relate to an apparatus for wireless communication performed by a UE. The apparatus may include a memory and one or more processors, coupled to the memory. The one or more processors may be configured to obtain an indication to transmit feedback via a first PSFCH resource. The one or more processors may be configured to select, based at least in part on a time threshold, a second PSFCH resource for transmitting the feedback. The one or more processors may be configured to transmit the feedback via the second PSFCH resource.

Some aspects described herein relate to a non-transitory computer-readable medium that stores a set of instructions for wireless communication by a UE. The set of instructions, when executed by one or more processors of the UE, may cause the UE to select a resource pool, from a plurality of resource pools for PSFCH communications, based at least in part on a first parameter of a set of parameters. The set of instructions, when executed by one or more processors of the UE, may cause the UE to select a resource block, from a plurality of resource blocks within the resource pool, based at least in part on a second parameter of the set of parameters. The set of instructions, when executed by one or more processors of the UE, may cause the UE to perform a PSFCH communication via the resource block selected from the plurality of resource blocks within the resource pool.

Some aspects described herein relate to a non-transitory computer-readable medium that stores a set of instructions for wireless communication by a UE. The set of instructions, when executed by one or more processors of the UE, may cause the UE to obtain an indication to transmit feedback via a first PSFCH resource. The set of instructions, when executed by one or more processors of the UE, may cause the UE to select, based at least in part on a time threshold, a second PSFCH resource for transmitting the feedback. The set of instructions, when executed by one or more processors of the UE, may cause the UE to transmit the feedback via the second PSFCH resource.

Some aspects described herein relate to an apparatus for wireless communication. The apparatus may include means for selecting a resource pool, from a plurality of resource pools for PSFCH communications, based at least in part on a first parameter of a set of parameters. The apparatus may include means for selecting a resource block, from a plurality of resource blocks within the resource pool, based at least in part on a second parameter of the set of parameters. The apparatus may include means for performing a PSFCH communication via the resource block selected from the plurality of resource blocks within the resource pool.

Some aspects described herein relate to an apparatus for wireless communication. The apparatus may include means for obtaining an indication to transmit feedback via a first PSFCH resource. The apparatus may include means for selecting, based at least in part on a time threshold, a second PSFCH resource for transmitting the feedback. The apparatus may include means for transmitting the feedback via the second PSFCH resource.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A and 5B are diagrams illustrating examples of slot structures, in accordance with the present disclosure.

FIGS. 6A and 6B are diagrams illustrating examples of mini-slot structures, in accordance with the present disclosure.

FIG. 7 is a diagram illustrating an example of physical sidelink feedback channel (PSFCH) resource mapping, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
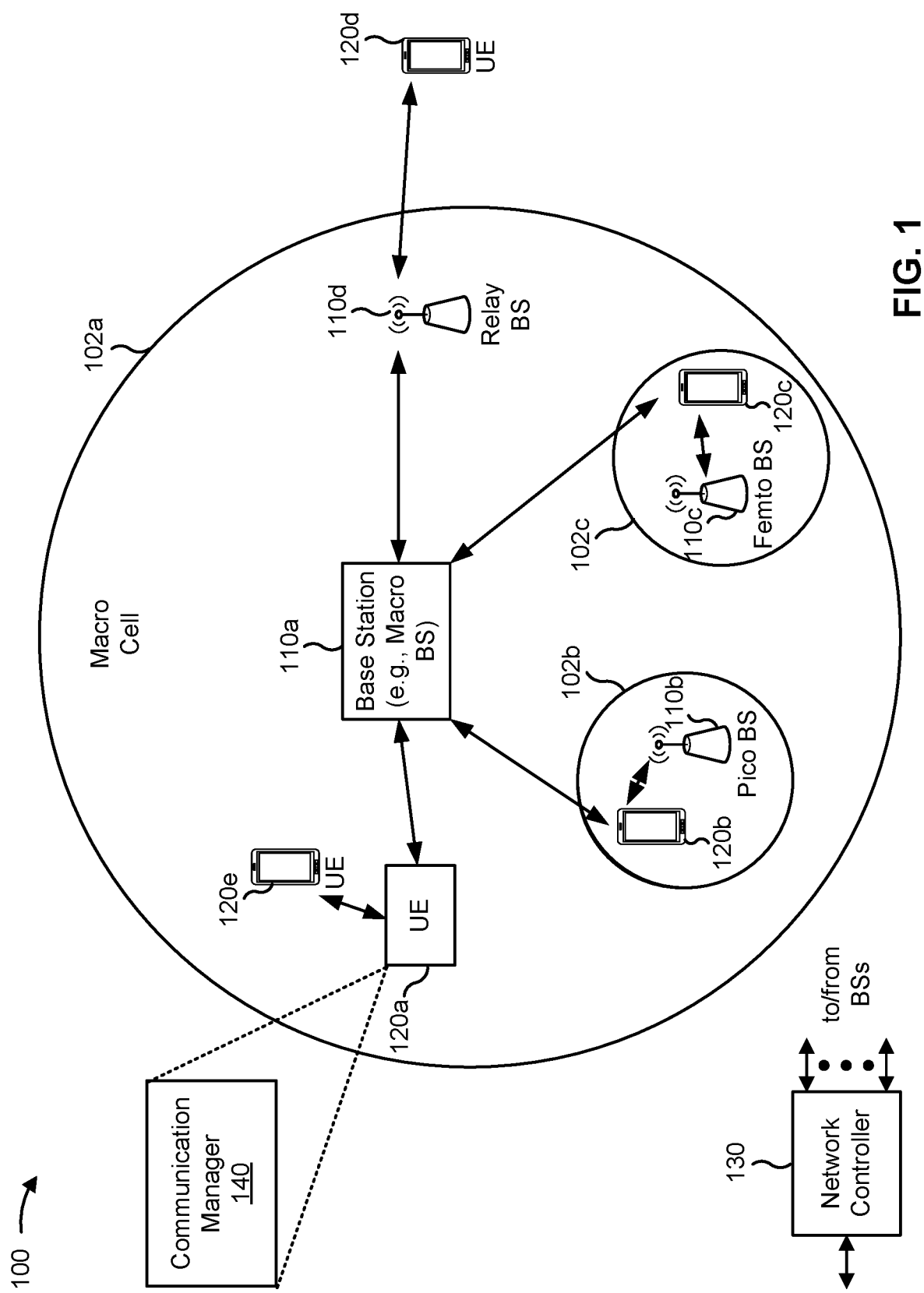
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although depicted as an integral unit in FIG. 1, aspects of the disclosure are not so limited. In some other aspects, the functionality of the base station 110 may be disaggregated according to an open radio access network (RAN) (O-RAN) architecture or the like. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHZ-7.125 GHZ) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may select a resource pool, from a plurality of resource pools for physical sidelink feedback channel (PSFCH) communications, based at least in part on a first parameter of a set of parameters; select a resource block, from a plurality of resource blocks within the resource pool, based at least in part on a second parameter of the set of parameters; and perform a PSFCH communication via the resource block selected from the plurality of resource blocks within the resource pool. Additionally, or alternatively, the communication manager 140 may perform one or more other operations described herein.

In some aspects, the communication manager 140 may obtain an indication to transmit feedback via a first PSFCH resource; select, based at least in part on a time threshold, a second PSFCH resource for transmitting the feedback; and transmit the feedback via the second PSFCH resource. Additionally, or alternatively, the communication manager 140 may perform one or more other operations described herein.

As indicated above, FIG. 1 is provided as an example. Other examples may differ from what is described with regard to FIG. 1.

Figure 2:
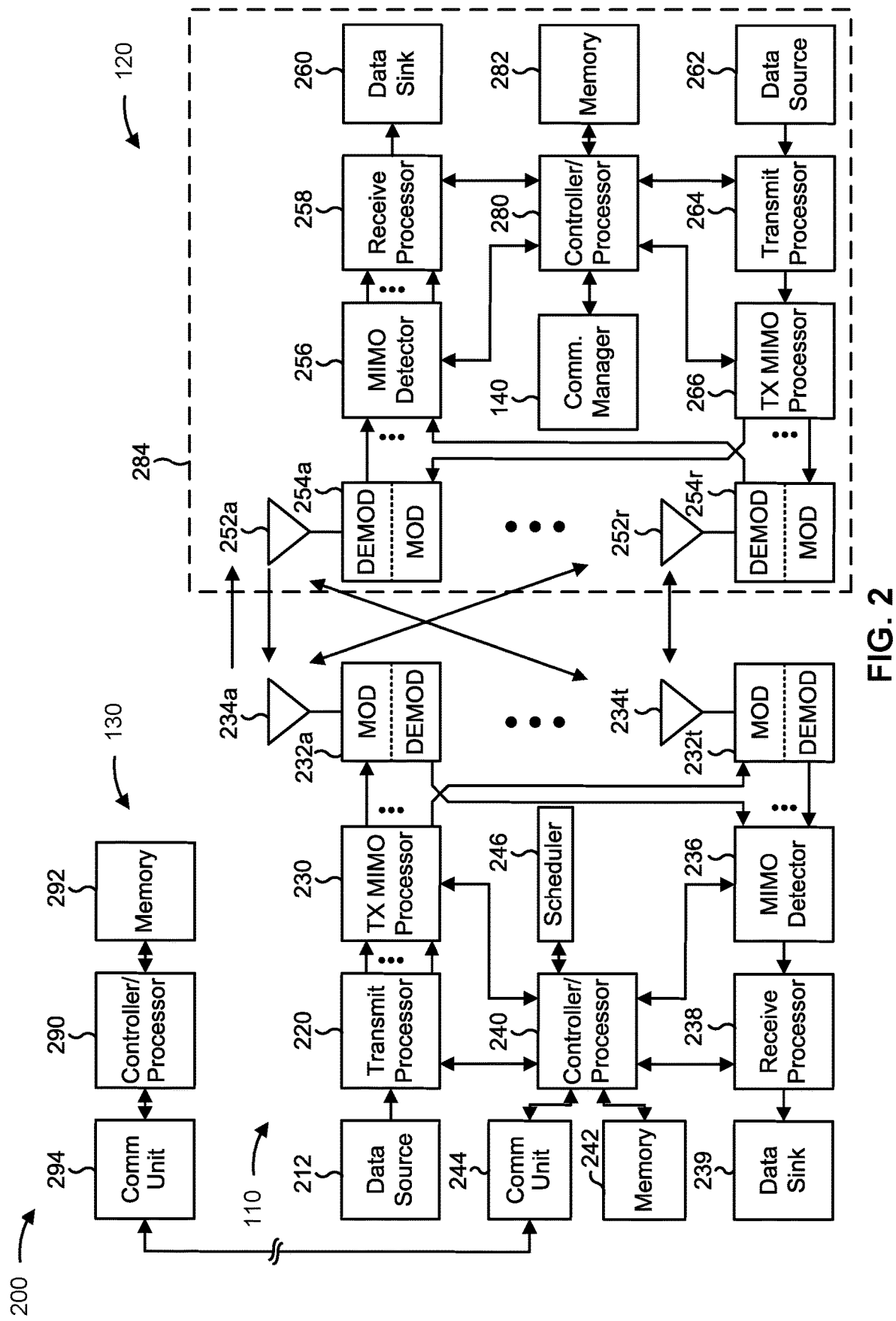
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-14).

The controller/processor 240 of the base station 110, the controller/processor 280 of the UE 120, and/or any other component(s) of FIG. 2 may perform one or more techniques associated with PSFCH resource selection, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the UE includes means for selecting a resource pool, from a plurality of resource pools for PSFCH communications, based at least in part on a first parameter of a set of parameters (e.g., using controller/processor 280, memory 282, or the like); means for selecting a resource block, from a plurality of resource blocks within the resource pool, based at least in part on a second parameter of the set of parameters (e.g., using controller/processor 280, memory 282, or the like); and/or means for performing a PSFCH communication via the resource block selected from the plurality of resource blocks within the resource pool (e.g., using controller/processor 280, transmit processor 264, TX MIMO processor 266, modem 254, antenna 252, memory 282, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for obtaining an indication to transmit feedback via a first PSFCH resource (e.g., using controller/processor 280, memory 282, or the like); means for selecting, based at least in part on a time threshold, a second PSFCH resource for transmitting the feedback (e.g., using controller/processor 280, memory 282, or the like); and/or means for transmitting the feedback via the second PSFCH resource (e.g., using controller/processor 280, transmit processor 264, TX MIMO processor 266, modem 254, antenna 252, memory 282, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
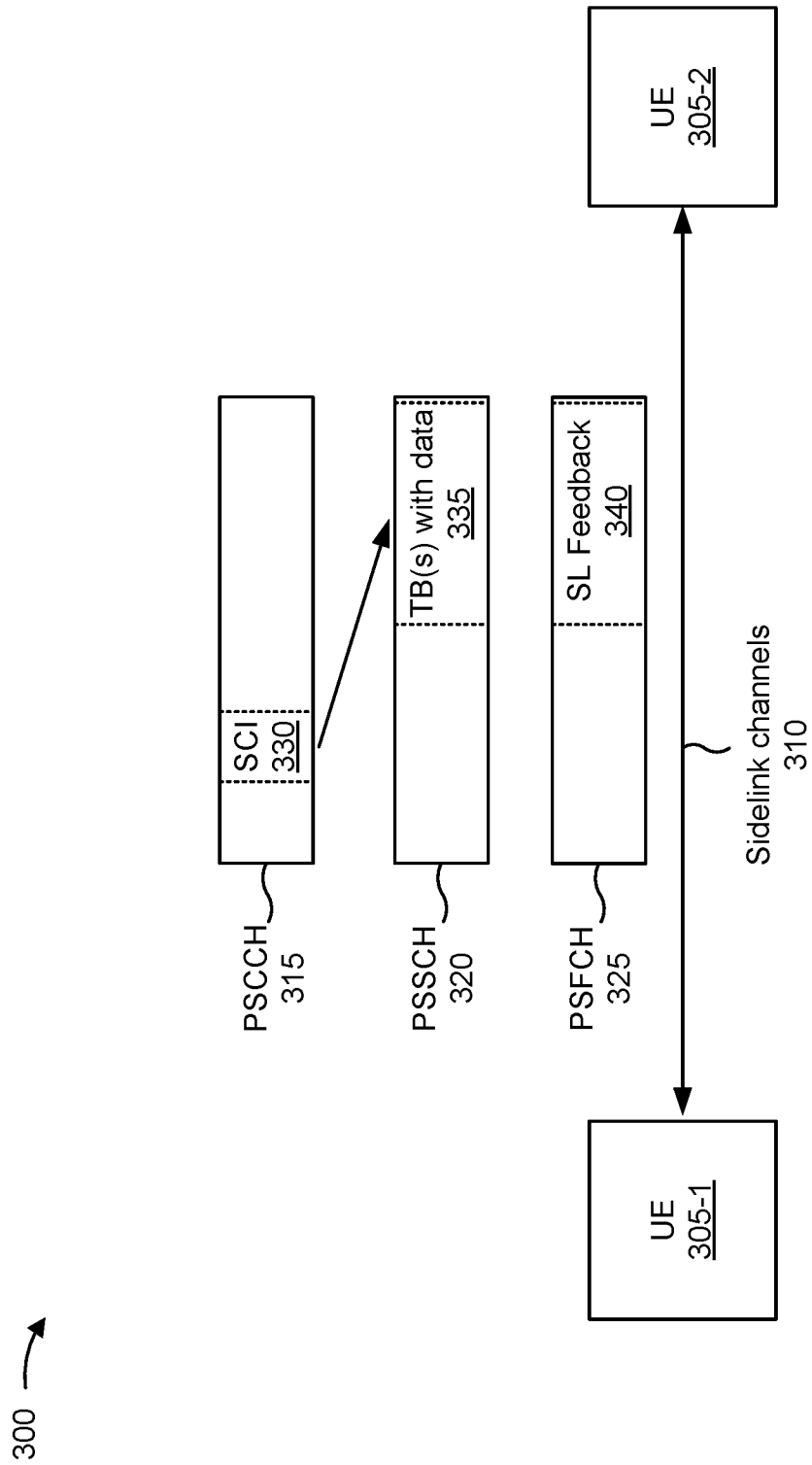
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QOS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some cases, the UE 305-1 may select the PSFCH 325 from a plurality of resource pools, and may transmit sidelink feedback to the UE 305-2 via the selected PSFCH 325.

As indicated above, FIG. 3 is provided as an example. Other examples may differ from what is described with respect to FIG. 3.

Figure 4:
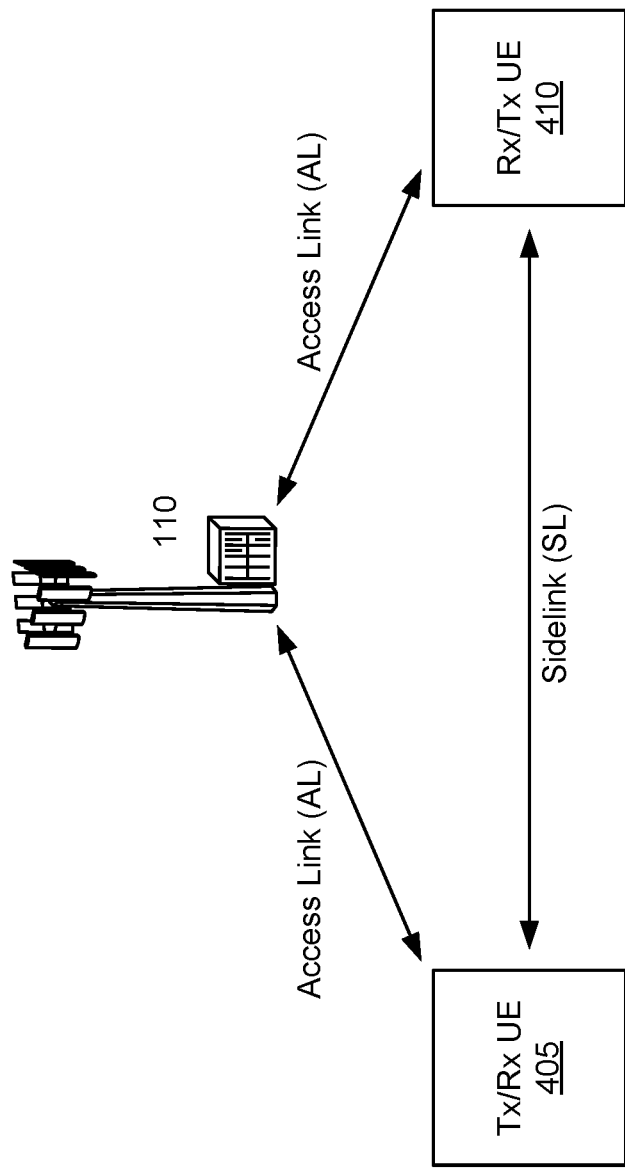
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some cases, the UE 405 may select a PSFCH from a plurality of resource pools, and may transmit sidelink feedback to the UE 410 via the selected PSFCH.

As indicated above, FIG. 4 is provided as an example. Other examples may differ from what is described with respect to FIG. 4.

FIGS. 5A and 5B are diagrams illustrating examples 500 and 505, respectively, of slot structures, in accordance with the present disclosure.

In some cases, to improve the reliability of HARQ feedback transmissions, particularly in the case of quick retransmissions, it may be important to maintain ultra-reliable low-latency communication (URLLC) QOS requirements. URLLC communications, as well as IoT communications, may have a diverse set of latency and reliability requirements. For example, some applications may have strict latency but relaxed reliability requirements, some applications may have strict reliability but relaxed latency requirements, and other applications may have strict latency and strict reliability requirements. With the expansion of sidelink communications to non-V2X use cases, such as industrial IoT (IIOT) and consumer use cases (e.g., extended reality (XR), smart wearables, among other examples), new sidelink communication schemes may be used to support the low latency and high reliability communications. For example, PSFCH improvements related to dedicating resource pools for PSFCH, and switching across resource pools to send feedback, may be utilized.

In some cases, sidelink slots may occur on U slots of a time division duplexing (TDD) system. The time between two sidelink slots may be 1.5 ms. In some cases, the PSFCH of a PSSCH may be sent after two slots (e.g., after 3 ms). In this case, the 1 ms delay requirement for URLLC communications may not be able to be satisfied. For example, one round trip time for sidelink communications cannot occur within 1 ms. Thus, more frequent PSFCH resources may be needed.

As shown in the example 500, a PSSCH 510 (e.g., PSSCH slot) may include a PSCCH 515. The PSSCH 510 may include a gap symbol 520. In some cases, the slot May include 14 OFDM symbols. However, sidelink communications may be configured to occupy fewer than the 14 symbols. In some cases, the first symbol may be repeated on the preceding symbol for automatic gain control (AGC) settling. In some cases, the sub-channel size may be configured based at least in part on a number of physical resource blocks (PRBs), such as 10, 15, 20, 25, 50, 75, or 100 PRBs, among other examples.

As shown in the example 505, a PSSCH 525 may include a PSCCH 530. The PSSCH 525 may include a plurality of gap symbols 535. Additionally, the PSSCH 525 may include a PSFCH 540 for transmitting feedback information, such as HARQ feedback or CSI. The PSFCH 540 may be located in one or more symbols of the PSSCH 525. In some cases, a second PSFCH symbol may be a repetition of a first PSFCH symbol for AGC settling.

As indicated above, FIGS. 5A and 5B are provided as examples. Other examples may differ from what is described with respect to FIGS. 5A and 5B.

FIGS. 6A and 6B are diagrams illustrating examples 600 and 605, respectively, of mini-slot structures, in accordance with the present disclosure.

In some cases, scheduling and turnaround times for sidelink communications may be reduced using mini-slot scheduling. In some cases, a mini-slot may be referred to as a sub-slot. As shown in the example 600, a slot 610 may comprise a plurality of mini-slots 615. Each of the mini-slots 615 may comprise a number of symbols, such as three symbols or four symbols. The mini-slots 615 within the slot 610 may be separated by a gap symbol 620. In some cases, each of the mini-slots 615 may include a PSSCH 625 and a PSCCH 630. The PSCCH 630 may be scheduled and decoded for the corresponding mini-slot. In some cases, as the number of mini-slots increases per-slot (which may enhance scheduling latency and may be suitable for small packet communication), more symbols may be allocated to the gaps 620. In some cases, for example, if a large number of UEs need to be supported, the overhead caused by this design may degrade the latency reduction gains.

In some cases, gap symbols may only be needed for transmission or reception switching (Tx/Rx switching). As shown in the example 605, a slot 635 may be split into multiple mini-slots 640 according to a given pattern (e.g., based at least in part on a length of each mini-slot or a number of mini-slots per slot). Each of the mini-slots may include a PSSCH 645. In some cases, a PSCCH 650 (or first stage SCI (SCI-1)) may be located at the beginning of the slot 635. The PSCCH 650 (or SCI-1) may indicate a transmission or reservation of a number of mini-slots in the slot 635, or in future slots. The slot 635 may include a gap symbol 655 at the end of the slot 635 (e.g., after the last mini-slot 640). In some cases, AGC symbols may not be needed since the receiver can set the AGC based at least in part on the first symbol of the slot and may use the same setting for the reception of any of the PSSCH mini-slots.

As indicated above, FIGS. 6A and 6B are provided as examples. Other examples may differ from what is described with respect to FIGS. 6A and 6B.

FIG. 7 is a diagram illustrating an example 700 of PSFCH resource mapping, in accordance with the present disclosure.

In some cases, a mapping between a PSSCH resource and a corresponding PSFCH resource may be based at least in part on the starting sub-channel of the PSSCH resource, the slot containing the PSSCH resource, the source identifier, the destination identifier, and/or a number of physical resource blocks (e.g., i=mod (sourceID+destinationID+ #PRBs). In some cases, the number of available PSFCH resources may be equal to, or greater than or equal to, the number of UEs in a groupcast communication session (e.g., a groupcast option 2 communication session). As shown in the example 700, a slot i and a sub-channel j, shown by reference number 705, may map to one or more of the PRBs 710.

In some cases, periodPSFCHresource may indicate a PSFCH periodicity, in number of slots, in a resource pool. In some cases, periodPSFCHresource can be set to 0, 1, 2, or 4. In some cases, if the periodPSFCHresource is set to 0, PSFCH transmissions from one or more UEs in the resource pool may be disabled. In some cases, the UE may transmit a PSFCH communication, in a first slot that includes a PSFCH resource and that is at least a certain number of slots, indicated MinTimeGapPSFCH, after a last slot of the PSSCH reception. In some cases, rbSetPSFCH may indicate a set of PRBs ($M_{PRB,set}^{PSFCH}$) in a resource pool for PSFCH transmissions. In some cases, numSubchannel may indicate a number of sub-channels ($N_{subch}$) for the resource pool. In some cases, $N_{PSSCH}^{PSECH}$ may indicate a number of PSSCH slots associated with a PSFCH slot, which may be determined by periodPSFCHresource.

In some cases, the PSFCH periodicity may be equal to four ($N_{PSSCH}^{PSFCH}=4$). In some cases, the number of sub-channels for the resource pool may be equal to ten ($N_{subch}=10$). In some cases, 80 PRBs may be allocated for the PSFCH, where $M_{subch,slot}^{PSFCH}=80/(4*10)=2$. In some cases, each sub-channel may be associated with two PSFCH PRBs. However, the PSFCH communication may be sent using only one of the PSFCH PRBs.

In some cases, when a PSSCH communication has a high priority, or when a NACK is observed, the minimum time to send feedback via the PSFCH may be two slots. For example, the time between the PSSCH communication being received, and the time between the feedback (e.g., HARQ) being transmitted on the PSFCH, may be two slots. However, this timing may not align with the PSFCH periodicity. In this case, it may be desirable for the UE to switch between PSFCH resource pools based at least in part on a priority of the PSFCH transmission.

Techniques and apparatuses are described herein for PSFCH resource pool selection. In some aspects, a UE may select a resource pool, from a plurality of resource pools for PSFCH communications, based at least in part on a first parameter of a set of parameters. The UE May select a resource block, from a plurality of resource blocks within the resource pool, based at least in part on a second parameter of the set of parameters. The UE may perform a PSFCH communication using the selected resource block of the selected resource pool. The set of parameters may include one or more of a source identifier, a destination identifier, a resource pool index, a bandwidth part index, a component carrier index, a priority indicator, and/or a QoS indicator. In some aspects, the UE may obtain an indication to transmit feedback via a first PSFCH resource. The UE may select, based at least in part on a time threshold, a second PSFCH resource for transmitting the feedback. The UE may transmit the feedback via the second PSFCH resource.

As described above, transmission of feedback for high priority communications may not align with a periodicity of the PSFCH. Using the techniques and apparatuses described herein, the UE may be configured to select a resource pool and/or a resource block for performing PSFCH communications. In some aspects, the UE may select a PSFCH resource for transmitting the feedback based at least in part on a time threshold. Thus, the UE may transmit feedback for the high priority communications quickly and at a time that aligns with the PSFCH periodicity.

As indicated above, FIG. 7 is provided as an example. Other examples may differ from what is described with respect to FIG. 7.

Figure 8:
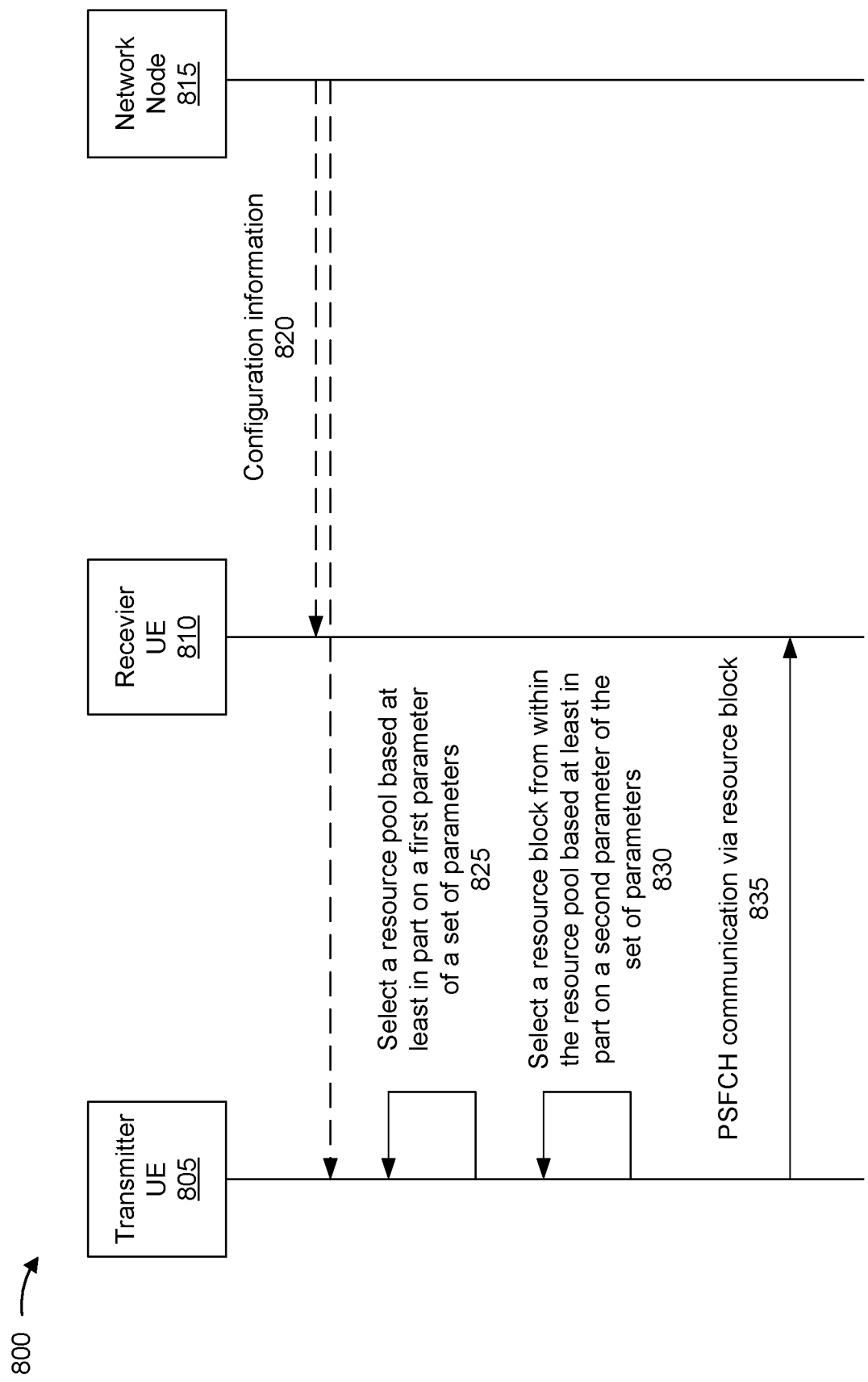
FIG. 8 is a diagram illustrating an example associated with PSFCH resource selection, in accordance with the present disclosure.

FIG. 8 is a diagram illustrating an example 800 of PSFCH resource selection, in accordance with the present disclosure. A transmitter UE 805 may communicate with a receiver UE 810. The transmitter UE 805 and the receiver UE 810 may include some or all of the features of the UE 120. The transmitter UE 805 and/or the receiver UE 810 may communicate with a network node 815. The network node 815 may include some or all of the features of the base station 110.

As shown in connection with reference number 820, the network node 815 may transmit, and the transmitter UE 805 or the receiver UE 810 may receive, configuration information. The configuration information may indicate a plurality of resource pools for performing PSFCH communications. In some aspects, the PSFCH communications may include HARQ feedback communications, such as a HARQ acknowledgement (HARQ-ACK) or a HARQ negative acknowledgement (HARQ-NACK). In some aspects, the PSFCH communications may include CSI.

In some aspects, there may be one or more defined PSFCHs in dedicated resource pools. In some aspects, the network node 815 may configure one or more resource pools within a bandwidth part (BWP) or a plurality of BWPs. The resource pool(s) may be used, for example, if the transmitter UE 805 or the receiver UE 810 are performing URLLC, or are using high priority or QoS applications.

As shown in connection with reference number 825, the transmitter UE 805 may select a resource pool, from a plurality of resource pools for PSFCH communications, based at least in part on a first parameter of a set of parameters. In some aspects, the set of parameters may include a source identifier, a destination identifier, a resource pool index, a bandwidth part index, a component carrier index, a priority indicator, and/or a QoS indicator, among other examples.

In some aspects, the transmitter UE 805 may determine a time index and a frequency index for selecting the resource pool. The time index may be determined based at least in part on the resource pool index, the bandwidth part index, the component carrier index, the priority indicator, and/or the QoS indicator, among other examples. The frequency index may be determined based at least in part on the source identifier and/or the destination identifier, among other examples.

In some aspects, selecting the resource pool may include selecting a first resource pool for transmitting HARQ feedback and selecting a second resource pool for transmitting CSI. In some aspects, the resource pool may include one or more mini-slots, such as the mini-slots described above in connection with FIGS. 6A and 6B.

In some aspects, selecting the resource pool may include selecting the resource pool based at least in part on Layer 1 information, such as DCI or PDSCH information. In some aspects, selecting the resource pool may include selecting the resource pool based at least in part on Layer 2 information, such as a MAC control element (MAC-CE). In some aspects, selecting the resource pool may include selecting the resource pool based at least in part on Layer 3 information, such as RRC information.

In some aspects, selecting the resource pool may include selecting the resource pool based at least in part on sidelink Layer 1 information, such as SCI or PSSCH information. In some aspects, selecting the resource pool may include selecting the resource pool based at least in part on sidelink Layer 2 information, such as a sidelink MAC-CE. In some aspects, selecting the resource pool may include selecting the resource pool based at least in part on sidelink Layer 3 information, such as sidelink RRC information.

As shown in connection with reference number 830, the transmitter UE 805 may select a resource block, from a plurality of resource blocks within the resource pool, based at least in part on a second parameter of the set of parameters.

In some aspects, the second parameter may be the same parameter as the first parameter, or may include the same parameter as the first parameter, from the set of parameters. For example, the first parameter and the second parameter may be a source identifier, or may include the source identifier. In some aspects, the second parameter may be a different parameter than the first parameter, or may include a different parameter than the first parameter, from the set of parameters. For example, the first parameter may be the source identifier, or may include the source identifier, and the second parameter may be the priority indicator, or may include the priority indicator.

In some aspects, the transmitter UE 805 may determine a time index and a frequency index for selecting the resource block. The time index may be determined based at least in part on a resource pool index, a bandwidth part index, a component carrier index, a priority indicator, and/or a QoS indicator, among other examples. The frequency index may be determined based at least in part on the source identifier and/or the destination identifier, among other examples. In some aspects, the resource pool index may include one or more unique identifiers that are unified (e.g., are the same) across a plurality of UEs. Additionally, or alternatively, the component carrier index and/or the BWP index may be unified across the plurality of UEs. In some aspects, the unique identifiers and/or the unified identifiers may be based at least in part on the resource pool index, the BWP index, the component carrier index, the priority indicator, and/or the QoS indicator that is assigned to the PSFCH. These identifiers may be used to determine or select the PSFCH.

In some aspects, selecting the resource block may include selecting the resource block based at least in part on Layer 1 information, such as DCI or PDSCH information. In some aspects, selecting the resource block may include selecting the resource block based at least in part on Layer 2 information, such as a MAC control element (MAC-CE). In some aspects, selecting the resource block may include selecting the resource block based at least in part on Layer 3 information, such as RRC information.

In some aspects, selecting the resource block may include selecting the resource block based at least in part on sidelink Layer 1 information, such as SCI or PSSCH information. In some aspects, selecting the resource block may include selecting the resource block based at least in part on sidelink Layer 2 information, such as a sidelink MAC-CE. In some aspects, selecting the resource block may include selecting the resource block based at least in part on sidelink Layer 3 information, such as sidelink RRC information.

In some aspects, a resource pool may be mapped to a certain PSFCH dedicated resource pool. One or more other parameters (e.g., from the set of parameters) may be used to obtain the time and frequency resources, or the set of time and frequency resources, for transmitting the feedback.

As shown in connection with reference number 835, the transmitter UE 805 may perform a PSFCH communication via the selected resource block. In some aspects, performing the PSFCH communication may include transmitting, to the receiver UE 810, a HARQ-ACK, HARQ-NACK, or CSI. In some aspects, the HARQ-ACK or HARQ-NACK may be transmitted via a first resource block or resource pool (e.g., the selected resource block or resource pool), and the CSI may be transmitted via another resource block or resource pool.

As described above, transmission of feedback for high priority communications may not align with a periodicity of the PSFCH. Using the techniques and apparatuses described herein, the transmitter UE 805 may be configured to select a resource pool and/or a resource block for performing PSFCH communications. Thus, the transmitter UE 805 may transmit feedback for the high priority communications quickly and at a time that aligns with the PSFCH periodicity.

As indicated above, FIG. 8 is provided as an example. Other examples may differ from what is described with respect to FIG. 8.

Figure 9:
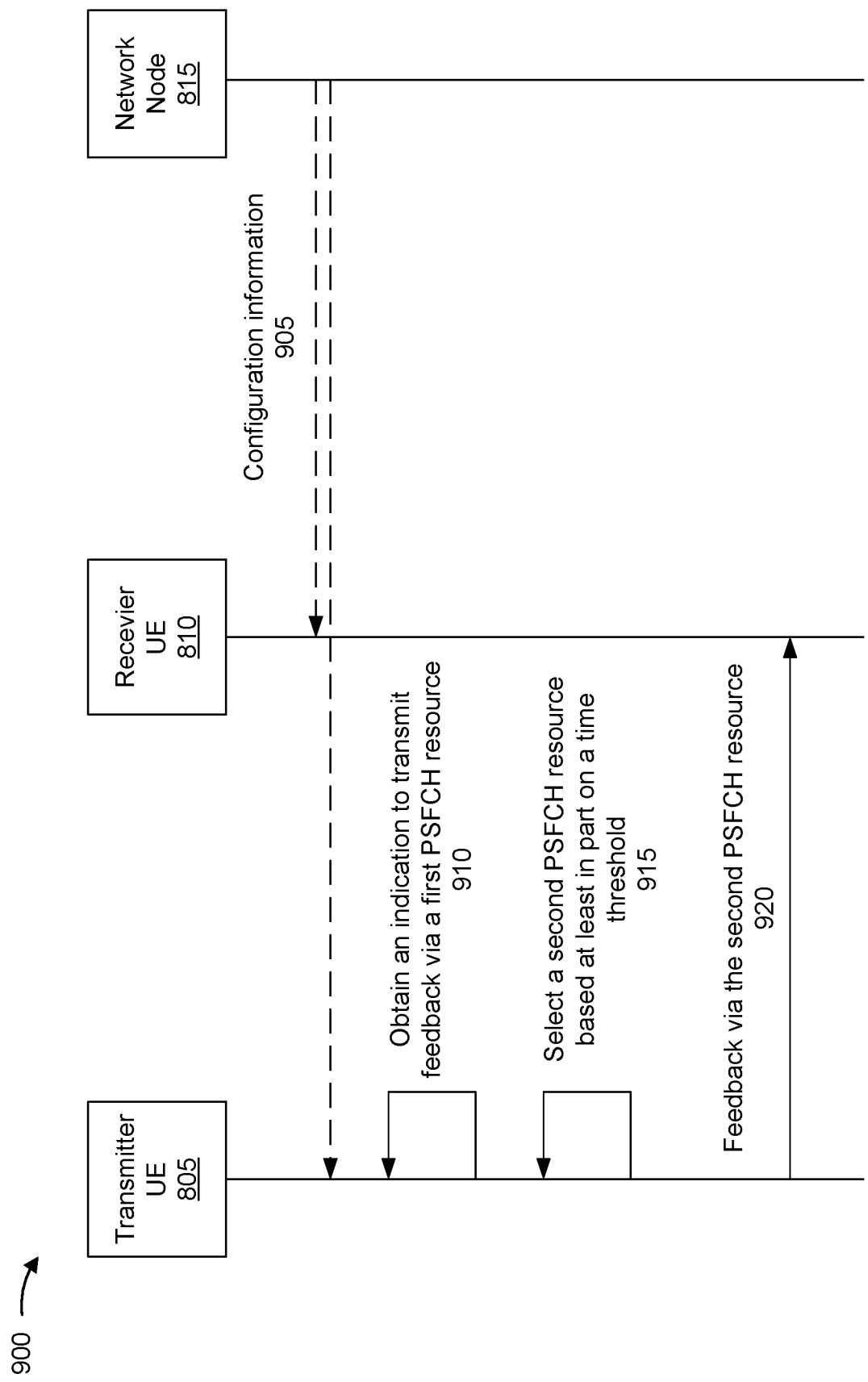
FIG. 9 is a diagram illustrating an example associated with PSFCH resource switching, in accordance with the present disclosure.

FIG. 9 is a diagram illustrating an example 900 of PSFCH resource switching, in accordance with the present disclosure.

As shown in connection with reference number 905, the network node 815 may transmit, and the transmitter UE 805 or the receiver UE 810 may receive, configuration information. The configuration information may indicate a time threshold for the transmitter UE 805 to transmit feedback via the PSFCH. In some aspects, the time threshold may be based at least in part on the minimum time gap indicator (MinTimeGapPSFCH). The minimum time gap indicator may indicate a minimum time period between receiving a PSSCH communication and transmitting feedback for the PSSCH communication via a PSFCH.

As shown in connection with reference number 910, the transmitter UE 805 may obtain an indication to transmit feedback via a first PSFCH resource. As described above, the feedback may include HARQ feedback, such as a HARQ-ACK or a HARQ-NACK, and/or may include CSI.

As shown in connection with reference number 915, the transmitter UE 805 may select a second PSFCH resource for transmitting the feedback based at least in part on a time threshold (e.g., the minimum time gap indicator). In some aspects, the second PSFCH resource may be closer in time than the first PSFCH resource. For example, the second PSFCH resource may be closer in time to the received PSSCH communication than the first PSFCH resource is to the received PSSCH communication.

In some aspects, the first PSFCH resource and the second PSFCH resource may have the same directionality. For example, the first PSFCH resource and the second PSFCH resource may both be transmitting resources, such as resources that are used for transmitting HARQ feedback or CSI. Alternatively, the first PSFCH and the second PSFCH may both be receiving resources, such as resources that are used for receiving PSSCH communications.

In some aspects, the transmitter UE 805 may select a set of candidate PSFCH resources from a plurality of PSFCH resources that includes the second PSFCH resources. The set of candidate PSFCH resources may be selected based at least in part on the minimum time gap and/or the directionality of the plurality of PSFCH resources. For example, each resource in the set of candidate PSFCH resources may be at least the minimum time gap from the PSSCH communication and may have the same directionality. In some aspects, the transmitter UE 805 may select the second PSFCH resource, from the set of candidate PSFCH resources, based at least in part on one or more resource characteristics. In some aspects, the transmitter UE 805 may select the second PSFCH resource based at least in part on an index of the second PSFCH resource, a priority of the second PSFCH resource, and/or a time of the PSFCH resource, among other examples. For example, the transmitter UE 805 may select the second PSFCH resource based at least in part on the second PSFCH resource being the resource with the lowest index, the resource with the lowest priority index (e.g., as defined by another UE), and/or the resource having the first in time PSFCH.

In some aspects, the transmitter UE 805 may select the second PSFCH resource based at least in part on a source identifier, a destination identifier, and/or a resource index, among other examples. For example, the transmitter UE 805 may select the second PSFCH resource based at least in part on the following: mod (source ID+destination ID+resource pool index). In some aspects, the resource index may correspond to an index of a resource that is used for receiving a PSSCH communication, an index of a resource that is used for transmitting feedback associated with the PSSCH communication, or a combination thereof.

In some aspects, the transmitter UE 805 may transmit feedback via a selected resource based at least in part on the type of feedback to be transmitted. For example, the transmitter UE 805 may transmit HARQ feedback via the second PSFCH resource and may transmit CSI via a third PSFCH resource. In another example, the transmitter UE 805 may transmit the CSI via the first PSFCH resource and may transmit HARQ feedback via the second PSFCH resource. In another example, the transmitter UE 805 may transmit the HARQ feedback via the first PSFCH resource and may transmit the CSI via the second PSFCH resource. In another example, the transmitter UE 805 may transmit an acknowledgement message (e.g., HARQ-ACK) via the first PSFCH resource and may transmit a negative acknowledgement message (e.g., HARQ-NACK) via the second PSFCH resource.

In some aspects, the transmitter UE 805 may select the second PSFCH resource based at least in part on information received from the network node 815. For example, the transmitter UE 805 may select the second PSFCH based at least in part on Layer 1 information, such as DCI or PDSCH information. In another example, the transmitter UE 805 may select the second PSFCH based at least in part on Layer 2 information, such as a MAC-CE. In another example, the transmitter UE 805 may select the second PSFCH based at least in part on Layer 3 information, such as RRC information.

In some aspects, the transmitter UE 805 may select the second PSFCH resource based at least in part on information received from another UE, such as the receiver UE 810. For example, the transmitter UE 805 may select the second PSFCH based at least in part on sidelink Layer 1 information, such as SCI or PSSCH information. In another example, the transmitter UE 805 may select the second PSFCH based at least in part on sidelink Layer 2 information, such as a sidelink MAC-CE. In another example, the transmitter UE 805 may select the second PSFCH based at least in part on sidelink Layer 3 information, such as sidelink RRC information.

In some aspects, the network node 815 may transmit configuration information (as described above) associated with the transmitter UE 805 switching between PSFCH resources. The receiver UE 810 may transmit information that enables the transmitter UE 805, or that instructs the transmitter UE 805, to switch between the PSFCH resources (e.g., from the first PSFCH resource to the second PSFCH resource). In some aspects, the network node 815 may be configured to disable the PSFCH switching by the transmitter UE 805.

In some aspects, the network node 815 may transmit a flag to the transmitter UE 805 that enables the transmitter UE 805 to switch to a certain PSFCH resource or resource pool. The network node 815 may transmit another flag to the transmitter UE 805 that enables UEs using the PSFCH resource or resource pool to switch to another PSFCH resource or resource pool. In some aspects, the flag(s) may limit the PSFCH resources or resource pools that the UEs are able to switch between. In some aspects, the flag(s) may be transmitted while configuring the PSFCH resource or resource pool (e.g., during an RRC configuration).

As shown in connection with reference number 920, the transmitter UE 805 may transmit, and the receiver UE 810 may receive, feedback via the second PSFCH resource. For example, the transmitter UE 805 may transmit a HARQ-ACK, a HARQ-NACK, or CSI via the second PSFCH resource.

As described above, transmission of feedback for high priority communications may not align with a periodicity of the PSFCH. Using the techniques and apparatuses described herein, the UE may be configured to switch between PSFCH resources for performing PSFCH communications. Thus, the UE may transmit feedback for the high priority communications quickly and at a time that aligns with the PSFCH periodicity.

As indicated above, FIG. 9 is provided as an example. Other examples may differ from what is described with respect to FIG. 9.

Figure 10:
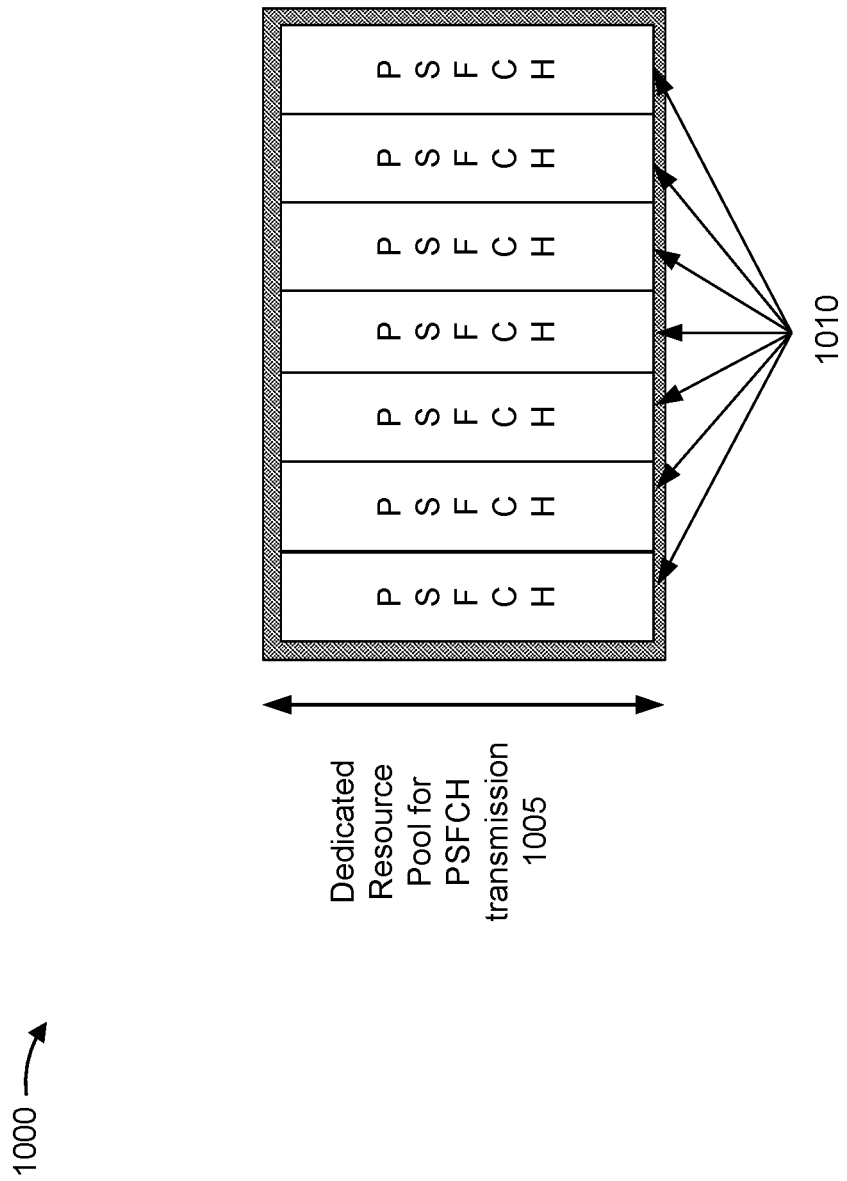
FIG. 10 is a diagram illustrating an example associated with a resource pool for PSFCH resource pool selection, in accordance with the present disclosure.

FIG. 10 is a diagram illustrating an example 1000 of a resource pool for PSFCH resource pool selection, in accordance with the present disclosure. A resource pool 1005 may include a plurality of resources, such as the PSFCH resources 1010. A UE (such as the transmitter UE 805) may be configured to select the resource pool 1005, from a plurality of resource pools 1005, and to select a PSFCH resource 1010, from the plurality of PSFCH resources 1010, for performing PSFCH communications (e.g., HARQ or CSI). In some aspects, the transmitter UE 805 may be configured to switch between the plurality of resources 1010, or between the plurality of resource pools 1005, for performing the PSFCH communications, as described herein.

As indicated above, FIG. 10 is provided as an example. Other examples may differ from what is described with respect to FIG. 10.

Figure 11:
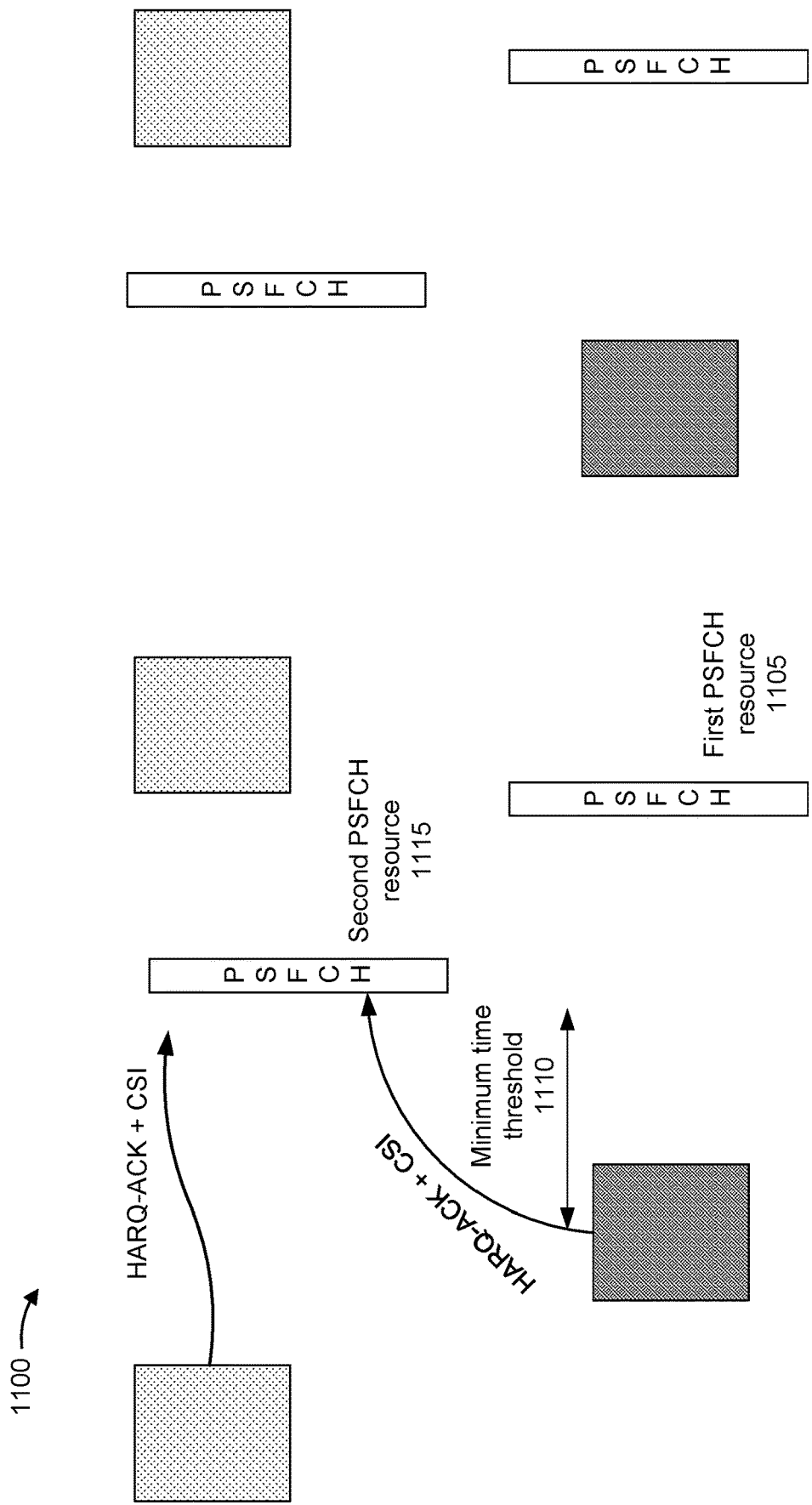
FIG. 11 is a diagram illustrating an example associated with PSFCH resources for PSFCH resource switching, in accordance with the present disclosure.

FIG. 11 is a diagram illustrating an example 1100 of PSFCH resources for PSFCH resource switching, in accordance with the present disclosure. As described herein, a UE (such as the transmitter UE 805) may receive a PSSCH communication that indicates to transmit feedback (e.g., HARQ or CSI) via a first PSFCH resource 1105. However, the PSSCH communication may be a high priority communication or a NACK, and it may be beneficial to send the feedback for the PSSCH communication as quickly as possible. The transmitter UE 805 may be configured to transmit the feedback via any PSFCH that is greater than a minimum time threshold 1110 from the PSSCH communication. The minimum time threshold 1110 may be the MinTimeGapPSFCH described herein. The transmitter UE 805 may determine to transmit the feedback via the second PSFCH resource 1115, which is the closest PSFCH resource to the PSSCH communication that is greater than the minimum time threshold 1110 from the PSSCH communication. This may provide feedback associated with the PSSCH communication more quickly, thereby enabling another UE (e.g., the receiver UE 810) to perform a retransmission (if needed) more quickly.

As indicated above, FIG. 11 is provided as an example. Other examples may differ from what is described with respect to FIG. 11.

Figure 12:
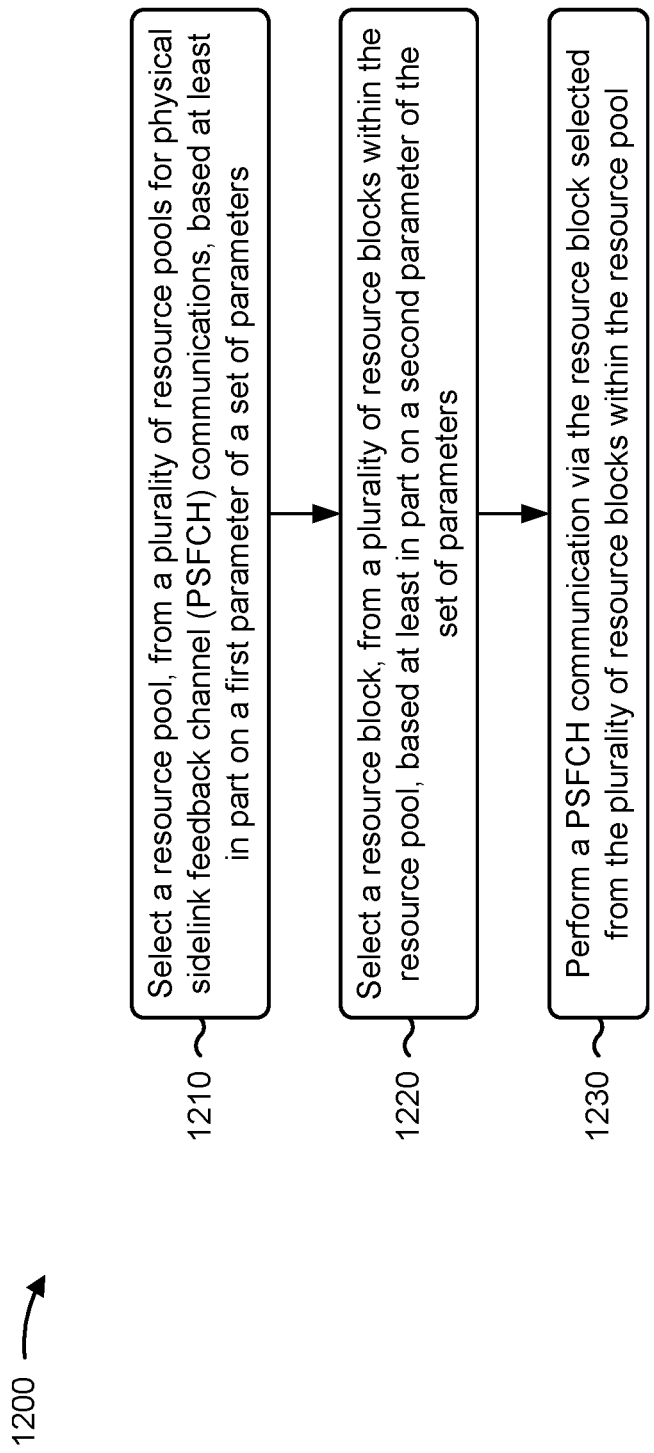
FIG. 12 is a diagram illustrating an example process associated with PSFCH resource selection, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with PSFCH resource selection.

As shown in FIG. 12, in some aspects, process 1200 may include selecting a resource pool, from a plurality of resource pools for PSFCH communications, based at least in part on a first parameter of a set of parameters (block 1210). For example, the UE (e.g., using communication manager 140 and/or selection component 1408, depicted in FIG. 14) may select a resource pool, from a plurality of resource pools for PSFCH communications, based at least in part on a first parameter of a set of parameters, as described above, for example, with reference to FIGS. 8, 9, 10, and/or 11.

As further shown in FIG. 12, in some aspects, process 1200 may include selecting a resource block, from a plurality of resource blocks within the resource pool, based at least in part on a second parameter of the set of parameters (block 1220). For example, the UE (e.g., using communication manager 140 and/or selection component 1408, depicted in FIG. 14) may select a resource block, from a plurality of resource blocks within the resource pool, based at least in part on a second parameter of the set of parameters, as described above, for example, with reference to FIGS. 8, 9, 10, and/or 11.

As further shown in FIG. 12, in some aspects, process 1200 may include performing a PSFCH communication via the resource block selected from the plurality of resource blocks within the resource pool (block 1230). For example, the UE (e.g., using communication manager 140 and/or transmission component 1404, depicted in FIG. 14) may perform a PSFCH communication via the resource block selected from the plurality of resource blocks within the resource pool, as described above, for example, with reference to FIGS. 8, 9, 10, and/or 11.

Process 1200 may include additional aspects, such as any single aspect or any combination of aspects described below and/or in connection with one or more other processes described elsewhere herein.

In a first aspect, the set of parameters comprises one or more of a source identifier, a destination identifier, a resource pool index, a bandwidth part index, a component carrier index, a priority indicator, or a quality of service indicator.

In a second aspect, alone or in combination with the first aspect, the first parameter and the second parameter are a same parameter from the set of parameters.

In a third aspect, alone or in combination with one or more of the first and second aspects, the first parameter and the second parameter are different parameters from the set of parameters.

In a fourth aspect, alone or in combination with one or more of the first through third aspects, process 1200 includes arranging the plurality of resource blocks into a time-frequency grid, wherein selecting the resource block based at least in part on the second parameter comprises selecting the resource block based at least in part on a time index and a frequency index.

In a fifth aspect, alone or in combination with one or more of the first through fourth aspects, the time index and the frequency index are determined based at least in part on a resource pool index, a bandwidth part index, a component carrier index, a priority indicator, a quality of service indicator, a source identifier, or a destination identifier.

In a sixth aspect, alone or in combination with one or more of the first through fifth aspects, selecting the resource pool based at least in part on the first parameter comprises selecting the resource pool based at least in part on a time index and a frequency index, wherein the time index is determined based at least in part on a resource pool index, a bandwidth part index, a component carrier index, a priority indicator, or a quality of service indicator, and wherein the frequency index is determined based at least in part on a source identifier or a destination identifier.

In a seventh aspect, alone or in combination with one or more of the first through sixth aspects, selecting the resource block based at least in part on the second parameter comprises selecting the resource block based at least in part on a time index and a frequency index, wherein the time index is determined based at least in part on a resource pool index, a bandwidth part index, a component carrier index, a priority indicator, or a quality of service indicator, and wherein the frequency index is determined based at least in part on a source identifier or a destination identifier.

In an eighth aspect, alone or in combination with one or more of the first through seventh aspects, performing the PSFCH communication comprises transmitting a HARQ acknowledgement message, a HARQ negative acknowledgement message, or channel state information.

In a ninth aspect, alone or in combination with one or more of the first through eighth aspects, the plurality of resource pools comprises a first set of resource pools for hybrid automatic repeat request communications and a second set of resource pools for channel state information communications.

In a tenth aspect, alone or in combination with one or more of the first through ninth aspects, the resource pool comprises one or more mini-slots.

In an eleventh aspect, alone or in combination with one or more of the first through tenth aspects, process 1200 includes selecting the resource pool or the resource block based at least in part on downlink control information, physical downlink shared channel information, medium access control information, or radio resource control information, or any combination thereof, received from a network node.

In a twelfth aspect, alone or in combination with one or more of the first through eleventh aspects, process 1200 includes selecting the resource pool or the resource block based at least in part on sidelink control information, physical sidelink shared channel information, medium access control information, or radio resource control information, or any combination thereof, received from another UE.

In a thirteenth aspect, alone or in combination with one or more of the first through twelfth aspects, process 1200 includes receiving a configuration that indicates the plurality of resource pools for the PSFCH communication.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
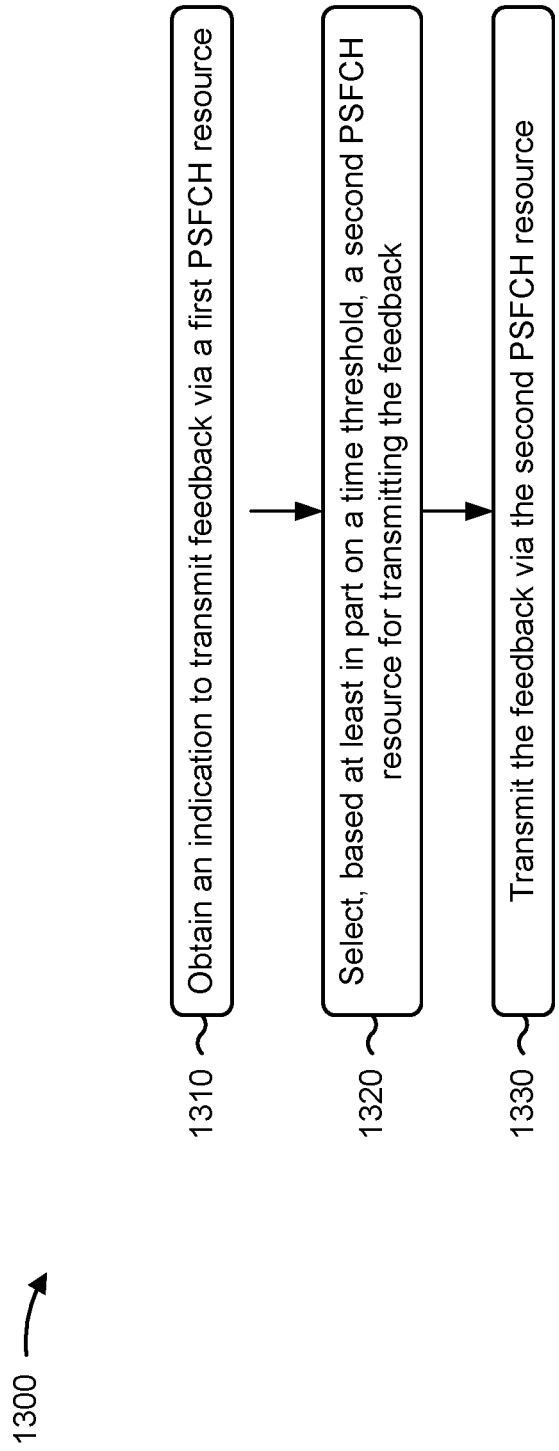
FIG. 13 is a diagram illustrating an example process associated with PSFCH resource switching, in accordance with the present disclosure.

FIG. 13 is a diagram illustrating an example process 1300 performed, for example, by a UE, in accordance with the present disclosure. Example process 1300 is an example where the UE (e.g., UE 120) performs operations associated with PSFCH resource selection.

As shown in FIG. 13, in some aspects, process 1300 may include obtaining an indication to transmit feedback via a first PSFCH resource (block 1310). For example, the UE (e.g., using communication manager 140 and/or obtaining component 1410, depicted in FIG. 14) may obtain an indication to transmit feedback via a first PSFCH resource, as described above, for example, with reference to FIGS. 8, 9, 10, and/or 11.

As further shown in FIG. 13, in some aspects, process 1300 may include selecting, based at least in part on a time threshold, a second PSFCH resource for transmitting the feedback (block 1320). For example, the UE (e.g., using communication manager 140 and/or selection component 1408, depicted in FIG. 14) may select, based at least in part on a time threshold, a second PSFCH resource for transmitting the feedback, as described above, for example, with reference to FIGS. 8, 9, 10, and/or 11.

As further shown in FIG. 13, in some aspects, process 1300 may include transmitting the feedback via the second PSFCH resource (block 1330). For example, the UE (e.g., using communication manager 140 and/or transmission component 1404, depicted in FIG. 14) may transmit the feedback via the second PSFCH resource, as described above, for example, with reference to FIGS. 8, 9, 10, and/or 11.

Process 1300 may include additional aspects, such as any single aspect or any combination of aspects described below and/or in connection with one or more other processes described elsewhere herein.

In a first aspect, the time threshold is a minimum time gap for transmitting the feedback after receiving a physical sidelink shared channel communication.

In a second aspect, alone or in combination with the first aspect, the first PSFCH resource and the second PSFCH resource have a same directionality.

In a third aspect, alone or in combination with one or more of the first and second aspects, process 1300 includes selecting a set of candidate PSFCH resources, from a plurality of PSFCH resources that includes the second PSFCH resource, based at least in part on the time threshold and a directionality of the plurality of PSFCH resources.

In a fourth aspect, alone or in combination with one or more of the first through third aspects, process 1300 includes selecting the second PSFCH resource, from the set of candidate PSFCH resources, based at least in part on an index of the second PSFCH resource, a priority of the second PSFCH resource, or a time of the PSFCH resource.

In a fifth aspect, alone or in combination with one or more of the first through fourth aspects, process 1300 includes selecting the second PSFCH resource based at least in part on a source identifier, a destination identifier, and a resource index.

In a sixth aspect, alone or in combination with one or more of the first through fifth aspects, the resource index corresponds to an index of a resource that is used for receiving a PSSCH communication or an index of a resource that is used for transmitting feedback associated with the PSSCH communication.

In a seventh aspect, alone or in combination with one or more of the first through sixth aspects, process 1300 includes selecting a third PSFCH resource for transmitting channel state information, wherein the second PSFCH resource for transmitting the feedback is a PSFCH resource for transmitting hybrid automatic repeat request feedback.

In an eighth aspect, alone or in combination with one or more of the first through seventh aspects, process 1300 includes transmitting HARQ feedback or CSI via the first PSFCH resource, wherein transmitting the feedback via the second PSFCH resource comprises transmitting the other of the HARQ feedback or the CSI via the second PSFCH resource.

In a ninth aspect, alone or in combination with one or more of the first through eighth aspects, process 1300 includes transmitting an acknowledgement message via the first PSFCH resource, wherein transmitting the feedback via the second PSFCH resource comprises transmitting a negative acknowledgement message via the second PSFCH resource.

In a tenth aspect, alone or in combination with one or more of the first through ninth aspects, process 1300 includes transmitting a first type of feedback via the first PSFCH resource and a second type of feedback via the second PSFCH resource based at least in part on a decoding characteristic of the first type of feedback and the second type of feedback.

In an eleventh aspect, alone or in combination with one or more of the first through tenth aspects, process 1300 includes receiving, from another UE, sidelink control information, physical sidelink shared channel information, medium access control information, or radio resource control information, or any combination thereof, that indicates to transmit the feedback via the second PSFCH resource.

In a twelfth aspect, alone or in combination with one or more of the first through eleventh aspects, process 1300 includes receiving, from a network node, DCI, PDSCH information, MAC information, or RRC information that enables the UE to transmit the feedback via the second PSFCH resource.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
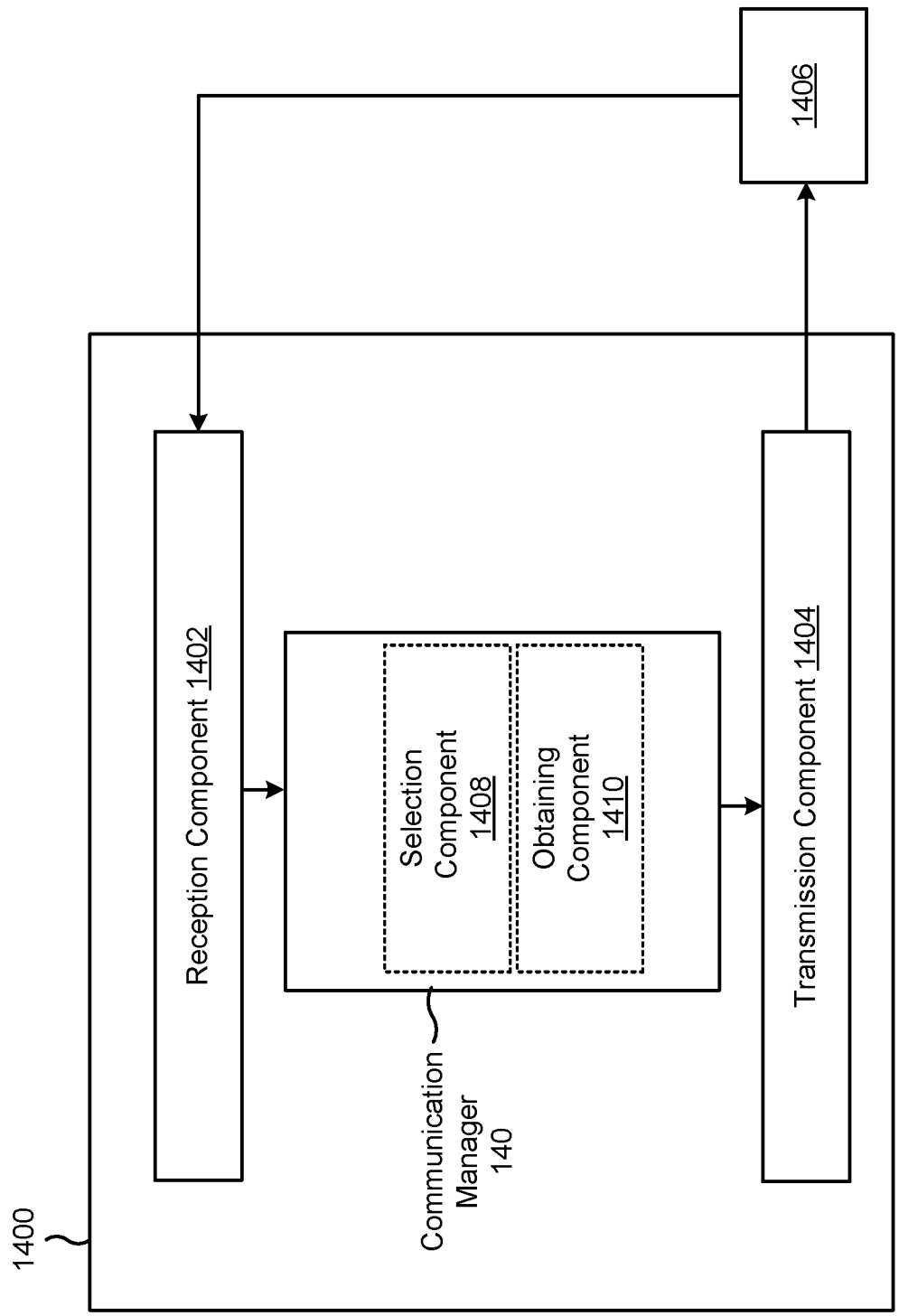
FIG. 14 is a diagram of an example apparatus for wireless communication, in accordance with the present disclosure.

FIG. 14 is a diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include one or more of a selection component 1408 or an obtaining component 1410, among other examples.

In some aspects, the apparatus 1400 may be configured to perform one or more operations described herein in connection with FIGS. 8-11. Additionally, or alternatively, the apparatus 1400 may be configured to perform one or more processes described herein, such as process 1200 of FIG. 12, process 1300 of FIG. 13, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The selection component 1408 may select a resource pool, from a plurality of resource pools for PSFCH communications, based at least in part on a first parameter of a set of parameters. The selection component 1408 may select a resource block, from a plurality of resource blocks within the resource pool, based at least in part on a second parameter of the set of parameters. The transmission component 1404 may perform a PSFCH communication via the resource block selected from the plurality of resource blocks within the resource pool.

The selection component 1408 may arrange the plurality of resource blocks into a time-frequency grid, wherein selecting the resource block based at least in part on the second parameter comprises selecting the resource block based at least in part on a time index and a frequency index.

The selection component 1408 may select the resource pool or the resource block based at least in part on downlink control information, physical downlink shared channel information, medium access control information, or radio resource control information, or any combination thereof, received from a network node.

The selection component 1408 may select the resource pool or the resource block based at least in part on sidelink control information, physical sidelink shared channel information, medium access control information, or radio resource control information, or any combination thereof, received from another UE.

The reception component 1402 may receive a configuration that indicates the plurality of resource pools for the PSFCH communication.

The obtaining component 1410 may obtain an indication to transmit feedback via a first PSFCH resource. The selection component 1408 may select, based at least in part on a time threshold, a second PSFCH resource for transmitting the feedback. The transmission component 1404 may transmit the feedback via the second PSFCH resource.

The selection component 1408 may select a set of candidate PSFCH resources, from a plurality of PSFCH resources that includes the second PSFCH resource, based at least in part on the time threshold and a directionality of the plurality of PSFCH resources.

The selection component 1408 may select the second PSFCH resource, from the set of candidate PSFCH resources, based at least in part on an index of the second PSFCH resource, a priority of the second PSFCH resource, or a time of the PSFCH resource.

The selection component 1408 may select the second PSFCH resource based at least in part on a source identifier, a destination identifier, and a resource index.

The selection component 1408 may select a third PSFCH resource for transmitting channel state information, wherein the second PSFCH resource for transmitting the feedback is a PSFCH resource for transmitting hybrid automatic repeat request feedback.

The transmission component 1404 may transmit HARQ feedback or CSI via the first PSFCH resource, wherein transmitting the feedback via the second PSFCH resource comprises transmitting the other of the HARQ feedback or the CSI via the second PSFCH resource.

The transmission component 1404 may transmit an acknowledgement message via the first PSFCH resource, wherein transmitting the feedback via the second PSFCH resource comprises transmitting a negative acknowledgement message via the second PSFCH resource.

The transmission component 1404 may transmit a first type of feedback via the first PSFCH resource and a second type of feedback via the second PSFCH resource based at least in part on a decoding characteristic of the first type of feedback and the second type of feedback.

The reception component 1402 may receive, from another UE, sidelink control information, physical sidelink shared channel information, medium access control information, or radio resource control information, or any combination thereof, that indicates to transmit the feedback via the second PSFCH resource.

The reception component 1402 may receive, from a network node, DCI, PDSCH information, MAC information, or RRC information that enables the UE to transmit the feedback via the second PSFCH resource.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: selecting a resource pool, from a plurality of resource pools for physical sidelink feedback channel (PSFCH) communications, based at least in part on a first parameter of a set of parameters; selecting a resource block, from a plurality of resource blocks within the resource pool, based at least in part on a second parameter of the set of parameters; and performing a PSFCH communication via the resource block selected from the plurality of resource blocks within the resource pool.

Aspect 2: The method of Aspect 1, wherein the set of parameters comprises one or more of a source identifier, a destination identifier, a resource pool index, a bandwidth part index, a component carrier index, a priority indicator, or a quality of service indicator.

Aspect 3: The method of Aspect 2, wherein the first parameter and the second parameter are a same parameter from the set of parameters.

Aspect 4: The method of Aspect 2, wherein the first parameter and the second parameter are different parameters from the set of parameters.

Aspect 5: The method of any of Aspects 1-4, further comprising arranging the plurality of resource blocks into a time-frequency grid, wherein selecting the resource block based at least in part on the second parameter comprises selecting the resource block based at least in part on a time index and a frequency index.

Aspect 6: The method of Aspect 5, wherein the time index and the frequency index are determined based at least in part on a resource pool index, a bandwidth part index, a component carrier index, a priority indicator, a quality of service indicator, a source identifier, or a destination identifier.

Aspect 7: The method of any of Aspects 1-6, wherein selecting the resource pool based at least in part on the first parameter comprises selecting the resource pool based at least in part on a time index and a frequency index, wherein the time index is determined based at least in part on a resource pool index, a bandwidth part index, a component carrier index, a priority indicator, or a quality of service indicator, and wherein the frequency index is determined based at least in part on a source identifier or a destination identifier.

Aspect 8: The method of any of Aspects 1-7, wherein selecting the resource block based at least in part on the second parameter comprises selecting the resource block based at least in part on a time index and a frequency index, wherein the time index is determined based at least in part on a resource pool index, a bandwidth part index, a component carrier index, a priority indicator, or a quality of service indicator, and wherein the frequency index is determined based at least in part on a source identifier or a destination identifier.

Aspect 9: The method of any of Aspects 1-8, wherein performing the PSFCH communication comprises transmitting a hybrid automatic repeat request (HARQ) acknowledgement message, a HARQ negative acknowledgement message, or channel state information.

Aspect 10: The method of any of Aspects 1-9, wherein the plurality of resource pools comprises a first set of resource pools for hybrid automatic repeat request communications and a second set of resource pools for channel state information communications.

Aspect 11: The method of any of Aspects 1-10, wherein the resource pool comprises one or more mini-slots.

Aspect 12: The method of any of Aspects 1-11, further comprising selecting the resource pool or the resource block based at least in part on downlink control information, physical downlink shared channel information, medium access control information, or radio resource control information, or any combination thereof, received from a network node.

Aspect 13: The method of any of Aspects 1-12, further comprising selecting the resource pool or the resource block based at least in part on sidelink control information, physical sidelink shared channel information, medium access control information, or radio resource control information, or any combination thereof, received from another UE.

Aspect 14: The method of any of Aspects 1-13, further comprising receiving a configuration that indicates the plurality of resource pools for the PSFCH communication.

Aspect 15: A method of wireless communication performed by a user equipment (UE), comprising: obtaining an indication to transmit feedback via a first physical sidelink feedback channel (PSFCH) resource; selecting, based at least in part on a time threshold, a second PSFCH resource for transmitting the feedback; and transmitting the feedback via the second PSFCH resource.

Aspect 16: The method of Aspect 15, wherein the time threshold is a minimum time gap for transmitting the feedback after receiving a physical sidelink shared channel communication.

Aspect 17: The method of any of Aspects 15-16, wherein the first PSFCH resource and the second PSFCH resource have a same directionality.

Aspect 18: The method of any of Aspects 15-17, further comprising selecting a set of candidate PSFCH resources, from a plurality of PSFCH resources that includes the second PSFCH resource, based at least in part on the time threshold and a directionality of the plurality of PSFCH resources.

Aspect 19: The method of Aspect 18, further comprising selecting the second PSFCH resource, from the set of candidate PSFCH resources, based at least in part on an index of the second PSFCH resource, a priority of the second PSFCH resource, or a time of the PSFCH resource.

Aspect 20: The method of any of Aspects 15-19, further comprising selecting the second PSFCH resource based at least in part on a source identifier, a destination identifier, and a resource index.

Aspect 21: The method of Aspect 20, wherein the resource index corresponds to an index of a resource that is used for receiving a physical sidelink shared channel (PSSCH) communication or an index of a resource that is used for transmitting feedback associated with the PSSCH communication.

Aspect 22: The method of any of Aspects 15-21, further comprising selecting a third PSFCH resource for transmitting channel state information, wherein the second PSFCH resource for transmitting the feedback is a PSFCH resource for transmitting hybrid automatic repeat request feedback.

Aspect 23: The method of any of Aspects 15-22, further comprising transmitting hybrid automatic repeat request (HARQ) feedback or channel state information (CSI) via the first PSFCH resource, wherein transmitting the feedback via the second PSFCH resource comprises transmitting the other of the HARQ feedback or the CSI via the second PSFCH resource.

Aspect 24: The method of any of Aspects 15-23, further comprising transmitting an acknowledgement message via the first PSFCH resource, wherein transmitting the feedback via the second PSFCH resource comprises transmitting a negative acknowledgement message via the second PSFCH resource.

Aspect 25: The method of any of Aspects 15-24, further comprising transmitting a first type of feedback via the first PSFCH resource and a second type of feedback via the second PSFCH resource based at least in part on a decoding characteristic of the first type of feedback and the second type of feedback.

Aspect 26: The method of any of Aspects 15-25, further comprising receiving, from another UE, sidelink control information, physical sidelink shared channel information, medium access control information, or radio resource control information, or any combination thereof, that indicates to transmit the feedback via the second PSFCH resource.

Aspect 27: The method of any of Aspects 15-26, further comprising receiving, from a network node, downlink control information (DCI), physical downlink shared channel (PDSCH) information, medium access control (MAC) information, or radio resource control (RRC) information that enables the UE to transmit the feedback via the second PSFCH resource.

Aspect 28: An apparatus for wireless communication at a device, comprising a processor; memory coupled with the processor; and instructions stored in the memory and executable by the processor to cause the apparatus to perform the method of one or more of Aspects 1-14.

Aspect 29: A device for wireless communication, comprising a memory and one or more processors coupled to the memory, the one or more processors configured to perform the method of one or more of Aspects 1-14.

Aspect 30: An apparatus for wireless communication, comprising at least one means for performing the method of one or more of Aspects 1-14.

Aspect 31: A non-transitory computer-readable medium storing code for wireless communication, the code comprising instructions executable by a processor to perform the method of one or more of Aspects 1-14.

Aspect 32: A non-transitory computer-readable medium storing a set of instructions for wireless communication, the set of instructions comprising one or more instructions that, when executed by one or more processors of a device, cause the device to perform the method of one or more of Aspects 1-14.

Aspect 33: An apparatus for wireless communication at a device, comprising a processor; memory coupled with the processor; and instructions stored in the memory and executable by the processor to cause the apparatus to perform the method of one or more of Aspects 15-27.

Aspect 34: A device for wireless communication, comprising a memory and one or more processors coupled to the memory, the one or more processors configured to perform the method of one or more of Aspects 15-27.

Aspect 35: An apparatus for wireless communication, comprising at least one means for performing the method of one or more of Aspects 15-27.

Aspect 36: A non-transitory computer-readable medium storing code for wireless communication, the code comprising instructions executable by a processor to perform the method of one or more of Aspects 15-27.

Aspect 37: A non-transitory computer-readable medium storing a set of instructions for wireless communication, the set of instructions comprising one or more instructions that, when executed by one or more processors of a device, cause the device to perform the method of one or more of Aspects 15-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
   select a resource pool, from a plurality of resource pools for physical sidelink feedback channel (PSFCH) communications, based at least in part on a first parameter of a set of parameters;
   arrange a plurality of resource blocks, within the resource pool, into a time-frequency grid;
   select a resource block, from the plurality of resource blocks, based at least in part on a time index and a frequency index that are each associated with the time-frequency grid, wherein the time index is based at least in part on a resource pool index, a bandwidth part index, a component carrier index, a priority indicator, and a quality of service indicator, and wherein the frequency index is based at least in part on a source identifier and a destination identifier; and
   perform a PSFCH communication via the resource block selected from the plurality of resource blocks within the resource pool.

2. The apparatus of claim 1, wherein the set of parameters comprises one or more of the source identifier, the destination identifier, the resource pool index, the bandwidth part index, the component carrier index, the priority indicator, or the quality of service indicator.

3. The apparatus of claim 2, wherein the first parameter is one of the source identifier, the destination identifier, the resource pool index, the bandwidth part index, the component carrier index, the priority indicator, or the quality of service indicator.

4. The apparatus of claim 1, wherein the first parameter is different from the source identifier, the destination identifier, the resource pool index, the bandwidth part index, the component carrier index, the priority indicator, or the quality of service indicator.

5. The apparatus of claim 1, wherein the one or more processors are further configured to determine the time index based at least in part on the resource pool index, the bandwidth part index, the component carrier index, the priority indicator, and the quality of service indicator.

6. The apparatus of claim 1, wherein the one or more processors, to perform the PSFCH communication, are configured to transmit a hybrid automatic repeat request (HARQ) acknowledgement message, a HARQ negative acknowledgement message, or channel state information.

7. The apparatus of claim 1, wherein the plurality of resource pools comprises a first set of resource pools for hybrid automatic repeat request communications and a second set of resource pools for channel state information communications.

8. The apparatus of claim 1, wherein the one or more processors are further configured to select the resource pool or the resource block based at least in part on downlink control information, physical downlink shared channel information, medium access control information, or radio resource control information, or any combination thereof, received from a network node.

9. The apparatus of claim 1, wherein the one or more processors are further configured to select the resource pool or the resource block based at least in part on sidelink control information, physical sidelink shared channel information, medium access control information, or radio resource control information, or any combination thereof, received from another UE.

10. An apparatus for wireless communication at a user equipment (UE), comprising:
a memory; and
one or more processors, coupled to the memory, configured to:
obtain an indication to transmit feedback via a first physical sidelink feedback channel (PSFCH) resource;
select, based at least in part on a time threshold, a second PSFCH resource for transmitting the feedback, wherein the second PSFCH resource is closer in time than the first PSFCH resource; and
transmit the feedback via the second PSFCH resource.

11. The apparatus of claim 10, wherein the time threshold is a minimum time gap for transmitting the feedback after receiving a physical sidelink shared channel communication.

12. The apparatus of claim 10, wherein the first PSFCH resource and the second PSFCH resource have a same directionality.

13. The apparatus of claim 10, wherein the one or more processors are further configured to select a set of candidate PSFCH resources, from a plurality of PSFCH resources that includes the second PSFCH resource, based at least in part on the time threshold and a directionality of the plurality of PSFCH resources.

14. The apparatus of claim 13, wherein the one or more processors are further configured to select the second PSFCH resource, from the set of candidate PSFCH resources, based at least in part on an index of the second PSFCH resource, a priority of the second PSFCH resource, or a time of the second PSFCH resource.

15. The apparatus of claim 10, wherein the one or more processors are further configured to select the second PSFCH resource based at least in part on a source identifier, a destination identifier, and a resource index, wherein the resource index corresponds to an index of a resource that is used for receiving a physical sidelink shared channel (PSSCH) communication or an index of a resource that is used for transmitting feedback associated with the PSSCH communication.

16. The apparatus of claim 10, wherein the one or more processors are further configured to select a third PSFCH resource for transmitting channel state information, wherein the second PSFCH resource for transmitting the feedback is a PSFCH resource for transmitting hybrid automatic repeat request feedback.

17. The apparatus of claim 10, wherein the feedback comprises hybrid automatic repeat request (HARQ) feedback or channel state information (CSI) feedback and wherein the one or more processors are further configured to:
transmit HARQ feedback or CSI feedback via the first PSFCH resource, wherein transmitting the feedback via the second PSFCH resource comprises transmitting the other of the HARQ feedback or the CSI feedback via the second PSFCH resource.

18. The apparatus of claim 10, wherein the one or more processors are further configured to transmit an acknowledgement message via the first PSFCH resource, wherein transmitting the feedback via the second PSFCH resource comprises transmitting a negative acknowledgement message via the second PSFCH resource.

19. The apparatus of claim 10, wherein the one or more processors are further configured to transmit a first type of feedback via the first PSFCH resource and a second type of feedback via the second PSFCH resource based at least in part on a decoding characteristic of the first type of feedback and the second type of feedback.

20. The apparatus of claim 10, wherein the one or more processors are further configured to:
receive configuration information indicating the time threshold,
wherein the indication is obtained based at least in part on receiving the configuration.

21. A method of wireless communication performed by a user equipment (UE), comprising:
selecting a resource pool, from a plurality of resource pools for physical sidelink feedback channel (PSFCH) communications, based at least in part on a first parameter of a set of parameters;
arranging a plurality of resource blocks, within the resource pool, into a time-frequency grid;
selecting a resource block, from the plurality of resource blocks, based at least in part on a time index and a frequency index that are each associated with the time-frequency grid, wherein the time index is based at least in part on a resource pool index, a bandwidth part index, a component carrier index, a priority indicator, and a quality of service indicator, and wherein the frequency index is based at least in part on a source identifier and a destination identifier; and
performing a PSFCH communication via the resource block selected from the plurality of resource blocks within the resource pool.

22. The method of claim 21, wherein the set of parameters comprises one or more of the source identifier, the destination identifier, the resource pool index, the bandwidth part index, the component carrier index, the priority indicator, or the quality of service indicator.

23. The method of claim 21, further comprising selecting the resource pool or the resource block based at least in part on downlink control information, physical downlink shared channel information, medium access control information, or radio resource control information, or any combination thereof, received from a network node.

24. The method of claim 21, further comprising selecting the resource pool or the resource block based at least in part on sidelink control information, physical sidelink shared channel information, medium access control information, or radio resource control information, or any combination thereof, received from another UE.

25. A method of wireless communication performed by a user equipment (UE), comprising:

obtaining an indication to transmit feedback via a first physical sidelink feedback channel (PSFCH) resource;

selecting, based at least in part on a time threshold, a second PSFCH resource for transmitting the feedback, wherein the second PSFCH resource is closer in time than the first PSFCH resource; and transmitting the feedback via the second PSFCH resource.

26. The method of claim 25, wherein the time threshold is a minimum time gap for transmitting the feedback after receiving a physical sidelink shared channel communication.

27. The method of claim 25, further comprising:

selecting a set of candidate PSFCH resources, from a plurality of PSFCH resources that includes the second PSFCH resource, based at least in part on the time threshold and a directionality of the plurality of PSFCH resources; and selecting the second PSFCH resource, from the set of candidate PSFCH resources, based at least in part on an index of the second PSFCH resource, a priority of the second PSFCH resource, or a time of the PSFCH resource.

28. The method of claim 25, further comprising selecting the second PSFCH resource based at least in part on a source identifier, a destination identifier, and a resource index, wherein the resource index corresponds to an index of a resource that is used for receiving a physical sidelink shared channel (PSSCH) communication or an index of a resource that is used for transmitting feedback associated with the PSSCH communication.

29. The method of claim 25, wherein the feedback comprises hybrid automatic repeat request (HARQ) feedback or channel state information (CSI) feedback, the method further comprising:

transmitting the HARQ feedback or the CSI feedback via the first PSFCH resource, wherein transmitting the feedback via the second PSFCH resource comprises transmitting the other of the HARQ feedback or the CSI feedback via the second PSFCH resource.

30. The method of claim 25, further comprising:

receiving configuration information indicating the time threshold, wherein the indication is obtained based at least in part on receiving the configuration.

* * * * *